(12) United States Patent
Hosaka et al.

(10) Patent No.: US 9,206,273 B2
(45) Date of Patent: Dec. 8, 2015

(54) SOLID CATALYST COMPONENT FOR POLYMERIZING OLEFINS, CATALYST FOR POLYMERIZING OLEFINS, AND PRODUCTION METHOD FOR POLYMERIZED OLEFINS

(71) Applicant: TOHO TITANIUM CO., LTD., Chigasaki-shi (JP)

(72) Inventors: Motoki Hosaka, Chigasaki (JP); Noriaki Nakamura, Chigasaki (JP); Toshihiko Sugano, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 14/427,204

(22) PCT Filed: Feb. 7, 2014

(86) PCT No.: PCT/JP2014/052886
§ 371 (c)(1),
(2) Date: Mar. 10, 2015

(87) PCT Pub. No.: WO2014/132777
PCT Pub. Date: Sep. 4, 2014

(65) Prior Publication Data
US 2015/0240003 A1    Aug. 27, 2015

(30) Foreign Application Priority Data

Feb. 27, 2013  (JP) ................................. 2013-037834

(51) Int. Cl.
*C08F 4/44*     (2006.01)
*C08F 4/06*     (2006.01)
(Continued)

(52) U.S. Cl.
CPC ............ *C08F 110/06* (2013.01); *C08F 210/06* (2013.01); *C08F 299/02* (2013.01)

(58) Field of Classification Search
CPC ................ C08F 4/06; C08F 4/60; C08F 4/02; B01J 37/00
USPC ................... 526/213, 142; 502/125, 127, 150
See application file for complete search history.

(56) References Cited

U.S. PATENT DOCUMENTS

| 4,952,649 A | 8/1990 | Kioka et al. |
| 5,494,872 A | 2/1996 | Hosaka et al. |

(Continued)

FOREIGN PATENT DOCUMENTS

| JP | 58-083006 A | 5/1983 |
| JP | 06-100639 A | 4/1994 |

(Continued)

OTHER PUBLICATIONS

International Search Report issued Mar. 18, 2014 in PCT/JP2014/052886 Filed Feb. 7, 2014.

(Continued)

*Primary Examiner* — Elizabeth Eng
(74) *Attorney, Agent, or Firm* — Oblon, McClelland, Maier & Neustadt, L.L.P.

(57) ABSTRACT

A solid catalyst component for olefin polymerization includes titanium, magnesium, a halogen, a compound represented by $(R^1)_k C_6 H_{4-k}(COOR^2)(COOR^3)$, and a compound represented by $R^4O-C(=O)-O-Z-OR^5$. The solid catalyst component is a novel solid catalyst component for olefin polymerization that achieves excellent olefin polymerization activity and activity with respect to hydrogen during polymerization, and can produce an olefin polymer that exhibits a high MFR, high stereoregularity, and excellent rigidity.

8 Claims, 1 Drawing Sheet

(51) Int. Cl.

| | |
|---|---|
| *C08F 4/60* | (2006.01) |
| *C08F 4/02* | (2006.01) |
| *B01J 37/00* | (2006.01) |
| *B01J 31/00* | (2006.01) |
| *C08F 110/06* | (2006.01) |
| *C08F 299/02* | (2006.01) |
| *C08F 210/06* | (2006.01) |

(56) References Cited

U.S. PATENT DOCUMENTS

| | | |
|---|---|---|
| 5,498,770 A | 3/1996 | Hosaka et al. |
| 5,684,173 A | 11/1997 | Hosaka et al. |
| 5,932,510 A | 8/1999 | Hosaka et al. |
| 5,965,478 A | 10/1999 | Goto et al. |
| 6,156,690 A | 12/2000 | Hosaka |
| 6,228,793 B1 | 5/2001 | Hosaka et al. |
| 6,664,209 B1 | 12/2003 | Hosaka |
| 6,670,497 B2 | 12/2003 | Tashino et al. |
| 6,770,586 B2 | 8/2004 | Tashino et al. |
| 6,855,656 B2 | 2/2005 | Hosaka et al. |
| 7,005,399 B2 | 2/2006 | Hosaka |
| 7,141,634 B2 | 11/2006 | Hosaka et al. |
| 7,208,435 B2 | 4/2007 | Hosaka et al. |
| 7,704,910 B2 | 4/2010 | Hosaka et al. |
| 8,247,504 B2 | 8/2012 | Yano et al. |
| 8,426,537 B2 | 4/2013 | Hosaka |
| 8,648,001 B2 | 2/2014 | Hosaka et al. |
| 2005/0054773 A1 | 3/2005 | Hosaka et al. |
| 2009/0253873 A1 | 10/2009 | Hosaka et al. |
| 2009/0253874 A1 | 10/2009 | Hosaka et al. |
| 2010/0190942 A1 | 7/2010 | Hosaka et al. |
| 2014/0221583 A1 | 8/2014 | Uozumi et al. |

FOREIGN PATENT DOCUMENTS

| | | | |
|---|---|---|---|
| JP | 06100639 A * | 4/1994 | ............ C08F 297/08 |
| JP | 2003-034664 A | 2/2003 | |
| JP | 2004-107462 A | 4/2004 | |
| JP | 2014-037521 A | 2/2014 | |
| WO | WO 2012/060361 A1 | 5/2012 | |
| WO | WO 2013/042400 A1 | 3/2013 | |
| WO | WO 2014/013916 A1 | 1/2014 | |

OTHER PUBLICATIONS

U.S. Appl. No. 14/427,143, filed Mar. 10, 2015, Hosaka, et al.
U.S. Appl. No. 14/427,169, filed Mar. 10, 2015, Hosaka, et al.
U.S. Appl. No. 14/407,184, filed Dec. 11, 2014, Hosaka, et al.
U.S. Appl. No. 08/041,171, filed Apr. 1, 1993, Hosaka, et al.
U.S. Appl. No. 14/427,099, filed Mar. 10, 2015, Hosaka, et al.

\* cited by examiner

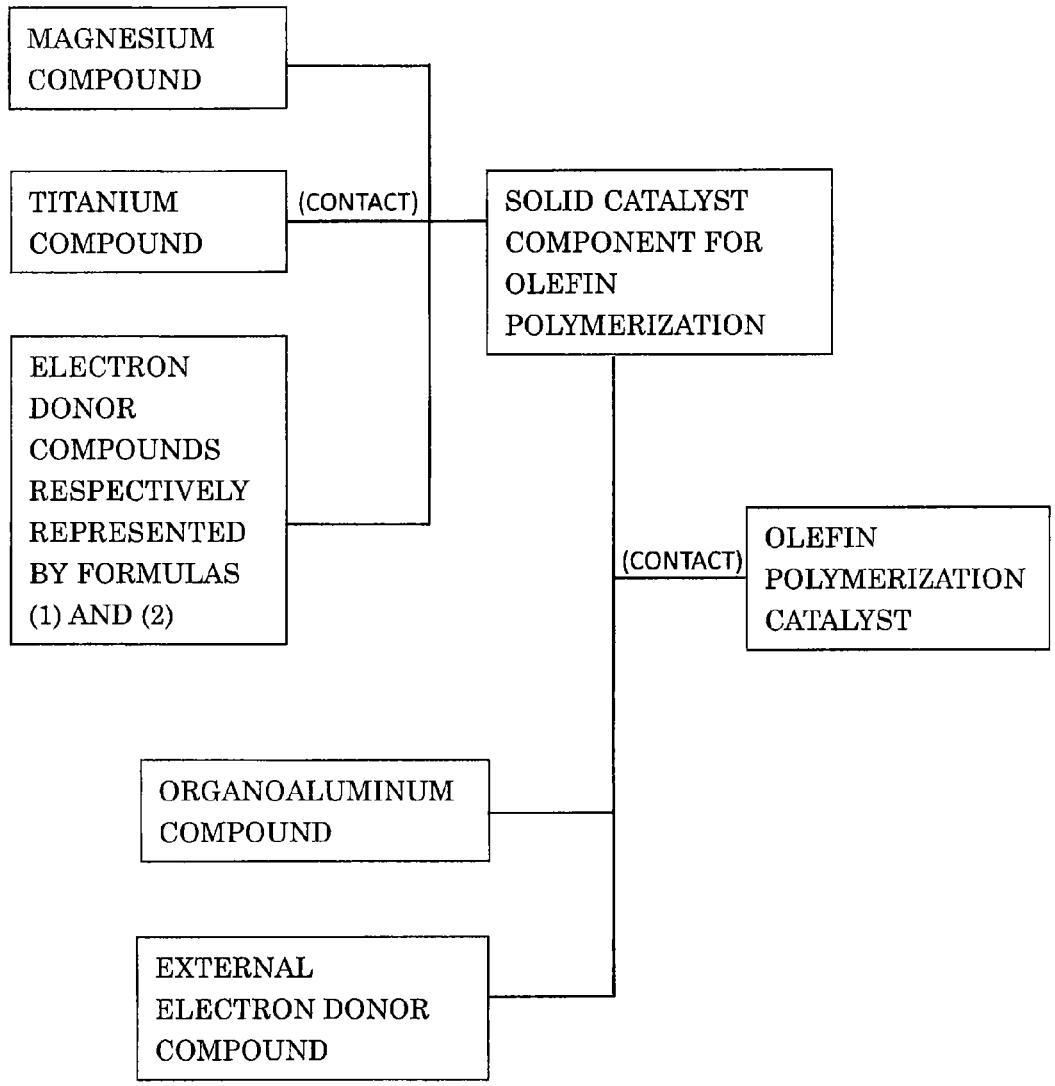

SOLID CATALYST COMPONENT FOR POLYMERIZING OLEFINS, CATALYST FOR POLYMERIZING OLEFINS, AND PRODUCTION METHOD FOR POLYMERIZED OLEFINS

TECHNICAL FIELD

The present invention relates to a solid catalyst component for olefin polymerization, an olefin polymerization catalyst, and a method for producing an olefin polymer.

BACKGROUND ART

An olefin (e.g., propylene) has been polymerized using an olefin polymerization catalyst. The resulting olefin polymer may be melted, molded using a molding machine, a stretching machine, or the like, and used for a variety of applications (e.g., automotive parts, home appliance parts, containers, and films).

A solid catalyst component that includes magnesium, titanium, an electron donor compound, and a halogen atom as essential components has been known as a component of the olefin polymerization catalyst. A number of olefin polymerization catalysts that include the solid catalyst component, an organoaluminum compound, and an organosilicon compound have been proposed.

An olefin polymer that exhibits higher flowability (melt flow rate (MFR)) has been desired, when molded using a molding machine, a stretching machine, or the like.

The MFR of an olefin polymer depends largely on the molecular weight of the olefin polymer, and an olefin polymer having a low molecular weight tends to have a high MFR. Therefore, the molecular weight of an olefin polymer is normally reduced by adding a large amount of hydrogen during polymerization in order to obtain an olefin polymer having a high MFR.

In recent years, an olefin polymer that has a high MFR, high stereoregularity, a reduced thickness, and high physical strength (i.e., excellent rigidity) has been desired for producing large home appliance parts and automotive parts (particularly a bumper).

In view of the above situation, the applicant of the present application proposed an olefin polymerization catalyst and an olefin polymerization method using the olefin polymerization catalyst, the olefin polymerization catalyst including a solid catalyst component, an organoaluminum compound, and an organosilicon compound, the solid catalyst component being obtained by bringing a magnesium compound, a tetravalent titanium halide compound, a malonic acid diester (internal electron donor compound), and a phthalic acid diester (internal electron donor compound) into contact with each other (see Patent Document 1 (JP-A-2004-107462)).

RELATED-ART DOCUMENT

Patent Document

Patent Document 1: JP-A-2004-107462

SUMMARY OF THE INVENTION

Technical Problem

The olefin polymerization catalyst disclosed in Patent Document 1 exhibits excellent activity with respect to hydrogen as compared with a known polymerization catalyst, and an olefin polymer obtained using the solid catalyst component disclosed in Patent Document 1 exhibits high flowability (MFR) when melted, and is particularly useful when producing a large molded article by injection molding or the like.

According to further studies conducted by the inventors of the invention, however, it was found that it is necessary to increase the amount of each internal electron donor compound in order to obtain a solid catalyst component having the desired internal electron donor compound content by simultaneously bringing two or more different internal electron donor compounds into contact with the other components to effect a reaction. As a result, an excess amount of complex of electron donor compound and the tetravalent titanium halide compound is easily formed, and the polymerization activity and the stereoregularity of the resulting olefin polymer easily decrease when using the resulting solid catalyst component as a component of an olefin polymerization catalyst.

Moreover, an olefin polymerization catalyst that can produce an olefin polymer with higher rigidity has been desired.

In view of the above situation, an object of the invention is to provide a novel solid catalyst component for olefin polymerization that achieves excellent olefin polymerization activity and the higher hydrogen response during polymerization, and can produce an olefin polymer that exhibits a high MFR, high stereoregularity, and excellent rigidity, an olefin polymerization catalyst, and a method for producing an olefin polymer.

Solution to Problem

The inventors conducted extensive studies in order to achieve the above object. As a result, the inventors found that the above object can be achieved by an olefin polymerization catalyst that indispensably includes a solid catalyst component that includes magnesium, titanium, a halogen, a specific aromatic dicarboxylic acid diester, and a specific compound that includes an ether group and a carbonate group. This finding has led to the completion of the invention.

According to one aspect of the invention, a solid catalyst component for olefin polymerization includes magnesium, titanium, a halogen, a compound represented by the following general formula (1), and a compound represented by the following general formula (2),

$$(R^1)_k C_6 H_{4-k}(COOR^2)(COOR^3) \tag{1}$$

wherein $R^1$ is an alkyl group having 1 to 8 carbon atoms or a halogen atom, $R^2$ and $R^3$ are an alkyl group having 1 to 12 carbon atoms, provided that $R^2$ and $R^3$ are either identical or different, and k, which is the number of substituents $R^1$, is 0, 1, or 2, provided that $R^1$ are either identical or different when k is 2,

$$R^4O-C(=O)-O-Z-OR^5 \tag{2}$$

wherein $R^4$ and $R^5$ are a linear alkyl group having 1 to 20 carbon atoms, a branched alkyl group having 3 to 20 carbon atoms, a vinyl group, a linear or branched alkenyl group having 3 to 20 carbon atoms, a linear halogen-substituted alkyl group having 1 to 20 carbon atoms, a branched halogen-substituted alkyl group having 3 to 20 carbon atoms, a linear halogen-substituted alkenyl group having 2 to 20 carbon atoms, a branched halogen-substituted alkenyl group having 3 to 20 carbon atoms, a cycloalkyl group having 3 to 20 carbon atoms, a cycloalkenyl group having 3 to 20 carbon atoms, a halogen-substituted cycloalkyl group having 3 to 20 carbon atoms, a halogen-substituted cycloalkenyl group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 2 to 24 carbon atoms that is terminated by a carbon atom, an oxygen atom-containing hydrocarbon group having 2 to 24 carbon atoms that is terminated by a carbon atom, or a phosphorus-containing hydrocarbon group having 2 to 24 carbon atoms that is terminated by a carbon atom, provided that $R^4$ and $R^5$ are either identical or different, the nitrogen atom-containing hydrocarbon group having 2 to 24 carbon atoms excludes a group that is terminated by a C=N group, the oxygen atom-containing hydrocarbon group having 2 to 24 carbon atoms excludes a group that is terminated by a carbonyl group, and the phosphorus-containing hydrocarbon group having 2 to 24 carbon atoms excludes a group that is terminated by a C=P group, and Z is a linking group that includes a carbon atom or a carbon chain.

According to another aspect of the invention, an olefin polymerization catalyst includes the solid catalyst component, an organoaluminum compound represented by the following general formula (3), and an optional external electron donor compound, $$R^6_p AlQ_{3-p} \qquad (3)$$

wherein $R^6$ is an alkyl group having 1 to 6 carbon atoms, Q is a hydrogen atom or a halogen atom, and p is a real number that satisfies $0 \leq p \leq 3$.

According to a further aspect of the invention, a method for producing an olefin polymer includes polymerizing an olefin in the presence of the olefin polymerization catalyst.

Advantageous Effects of the Invention

The aspects of the invention thus provide a novel solid catalyst component for olefin polymerization that achieves excellent olefin polymerization activity and the higher hydrogen response during polymerization, and can produce an olefin polymer that exhibits a high MFR, high stereoregularity, and excellent rigidity, and also provide an olefin polymerization catalyst, and a method for producing an olefin polymer.

BRIEF DESCRIPTION OF DRAWINGS

FIG. 1 is a flowchart illustrating a process for producing a polymerization catalyst according to one embodiment of the invention.

DESCRIPTION OF EMBODIMENTS

A solid catalyst component for olefin polymerization (hereinafter may be referred to as "component (I)" or "solid catalyst component (I)") according to one embodiment of the invention includes magnesium, titanium, a halogen, an electron donor compound represented by the general formula (1) (hereinafter may be referred to as "component (A)" or "compound (A)"), and an electron donor compound represented by the general formula (2) (hereinafter may be referred to as "component (B)" or "compound (B)"), as essential components.

Examples of the halogen include a fluorine atom, a chlorine atom, a bromine atom, and an iodine atom. Among these, a chlorine atom, a bromine atom, and an iodine atom are preferable, and a chlorine atom and an iodine atom are particularly preferable.

$R^1$ in the general formula (1) is a halogen atom or an alkyl group having 1 to 8 carbon atoms. The halogen atom represented by $R^1$ may be one or more atoms selected from a fluorine atom, a chlorine atom, a bromine atom, and an iodine atom. The alkyl group having 1 to 8 carbon atoms represented by $R^1$ may be one or more groups selected from a methyl group, an ethyl group, a n-propyl group, an isopropyl group, a n-butyl group, an isobutyl group, a t-butyl group, a n-pentyl group, an isopentyl group, a neopentyl group, a n-hexyl group, an isohexyl group, a 2,2-dimethylbutyl group, a 2,2-dimethylpentyl group, an isooctyl group, and a 2,2-dimethylhexyl group. $R^1$ is preferably a methyl group, a bromine atom, or a fluorine atom, and more preferably a methyl group or a bromine atom.

$R^2$ and $R^3$ in the general formula (1) are an alkyl group having 1 to 12 carbon atoms, provided that $R^2$ and $R^3$ are either identical or different. Examples of the alkyl group having 1 to 12 carbon atoms include a methyl group, an ethyl group, a n-propyl group, an isopropyl group, a n-butyl group, an isobutyl group, a t-butyl group, a n-pentyl group, an isopentyl group, a neopentyl group, a n-hexyl group, an isohexyl group, a 2,2-dimethylbutyl group, a 2,2-dimethylpentyl group, an isooctyl group, a 2,2-dimethylhexyl group, a n-nonyl group, an isononyl group, a n-decyl group, an isodecyl group, and a n-dodecyl group. Among these, an ethyl group, a n-propyl group, a n-butyl group, an isobutyl group, a t-butyl group, a neopentyl group, an isohexyl group, and an isooctyl group are preferable, and an ethyl group, a n-propyl group, a n-butyl group, an isobutyl group, and a neopentyl group are more preferable.

k (i.e., the number of substituents $R^1$) in the general formula (1) is 0, 1, or 2, provided that $R^1$ (two $R^1$) are either identical or different when k is 2. The compound represented by the general formula (1) is a phthalic acid diester when k is 0, and is a substituted phthalic acid diester when k is 1 or 2. When k is 1, it is preferable that $R^1$ in the general formula (1) substitute the hydrogen atom at position 3, 4, or 5 of the benzene ring. When k is 2, it is preferable that $R^1$ in the general formula (1) substitute the hydrogen atoms at positions 4 and 5 of the benzene ring.

Specific examples of the aromatic dicarboxylic acid diester represented by the general formula (1) include phthalic acid diesters such as dimethyl phthalate, diethyl phthalate, di-n-propyl phthalate, diisopropyl phthalate, di-n-butyl phthalate, diisobutyl phthalate, di-n-pentyl phthalate, diisopentyl phthalate, dineopentyl phthalate, di-n-hexyl phthalate, dithexyl phthalate, methylethyl phthalate, ethyl-n-propyl phthalate, ethylisopropyl phthalate, ethyl-n-butyl phthalate, ethylisobutyl phthalate, ethyl-n-pentyl phthalate, ethylisopentyl phthalate, ethylneopentyl phthalate, and ethyl-n-hexyl phthalate, halogen-substituted phthalic acid diesters such as diethyl 4-chlorophthalate, di-n-propyl 4-chlorophthalate, diisopropyl 4-chlorophthalate, di-n-butyl 4-chlorophthalate, diisobutyl 4-chlorophthalate, diethyl 4-bromophthalate, di-n-propyl 4-bromophthalate, diisopropyl 4-bromophthalate, di-n-butyl 4-bromophthalate, and diisobutyl 4-bromophthalate, alkyl-substituted phthalic acid diesters such as diethyl 4-methylphthalate, di-n-propyl 4-methylphthalate, diisopropyl 4-methylphthalate, di-n-butyl 4-methylphthalate, and diisobutyl 4-methylphthalate, and the like.

Among these, diethyl phthalate, di-n-propyl phthalate, di-n-butyl phthalate, diisobutyl phthalate, di-n-pentyl phthalate, diisopentyl phthalate, dineopentyl phthalate, di-n-hexyl phthalate, ethyl-n-propyl phthalate, ethylisopropyl phthalate, ethyl-n-butyl phthalate, ethylisobutyl phthalate, diethyl 4-methylphthalate, di-n-propyl 4-methylphthalate, diisobutyl 4-methylphthalate, diisobutyl 4-bromophthalate, diisopentyl 4-bromophthalate, dineopentyl 4-bromophthalate, and the like are preferable, and diethyl phthalate, di-n-propyl phthalate, di-n-butyl phthalate, diisobutyl phthalate, ethyl-n-propyl phthalate, ethylisopropyl phthalate, ethyl-n-butyl phthalate, ethylisobutyl phthalate, diethyl 4-methylphthalate, di-n-propyl 4-methylphthalate, diisobutyl 4-methylphthalate, diisobutyl 4-bromophthalate, diisopentyl 4-bromophthalate, and dineopentyl 4-bromophthalate are more preferable.

Examples of the linear alkyl group having 1 to 20 carbon atoms that may be represented by $R^4$ and $R^5$ in the general formula (2) include a methyl group, an ethyl group, a n-propyl group, a n-butyl group, a n-pentyl group, a n-hexyl group, a n-heptyl group, a n-octyl group, a n-nonyl group, a n-decyl group, and the like. Among these, linear alkyl groups having 1 to 12 carbon atoms are preferable.

Examples of the branched alkyl group having 3 to 20 carbon atoms that may be represented by $R^4$ and $R^5$ include alkyl groups that include a secondary carbon atom or a tertiary carbon atom (e.g., isopropyl group, isobutyl group, t-butyl group, isopentyl group, and neopentyl group). Among these, branched alkyl groups having 3 to 12 carbon atoms are preferable.

Examples of the linear alkenyl group having 3 to 20 carbon atoms that may be represented by $R^4$ and $R^5$ include an allyl group, a 3-butenyl group, a 4-hexenyl group, a 5-hexenyl group, a 7-octenyl group, a 10-dodecenyl group, and the like. Among these, linear alkenyl groups having 3 to 12 carbon atoms are preferable. Examples of the branched alkenyl group having 3 to 20 carbon atoms include an isopropenyl group, an isobutenyl group, an isopentenyl group, a 2-ethyl-3-hexenyl group, and the like. Among these, branched alkenyl groups having 3 to 12 carbon atoms are preferable.

Examples of the linear halogen-substituted alkyl groups having 1 to 20 carbon atoms that may be represented by $R^4$ and $R^5$ include a methyl halide group, an ethyl halide group, a n-propyl halide group, a n-butyl halide group, a n-pentyl halide group, a n-hexyl halide group, a n-heptyl halide group, a n-octyl halide group, a nonyl halide group, a decyl halide group, a halogen-substituted undecyl group, a halogen-substituted dodecyl group, and the like. Among these, linear halogen-substituted alkyl groups having 1 to 12 carbon atoms are preferable. Examples of the branched halogen-substituted alkyl group having 3 to 20 carbon atoms include an isopropyl halide group, an isobutyl halide group, a 2-ethylhexyl halide group, a neopentyl halide group, and the like. Among these, branched halogen-substituted alkyl groups having 3 to 12 carbon atoms are preferable.

Examples of the linear halogen-substituted alkenyl group having 2 to 20 carbon atoms that may be represented by $R^4$ and $R^5$ include a 2-halogenated vinyl group, a 3-halogenated allyl group, a 3-halogenated 2-butenyl group, a 4-halogenated 3-butenyl group, a perhalogenated 2-butenyl group, a 6-halogenated 4-hexenyl group, a 3-trihalogenated methyl-2-propenyl group, and the like. Among these, halogen-substituted alkenyl groups having 2 to 12 carbon atoms are preferable. Examples of the branched halogen-substituted alkenyl group having 3 to 20 carbon atoms include a 3-trihalogenated 2-butenyl group, a 2-pentahalogenated ethyl-3-hexenyl group, a 6-halogenated 3-ethyl-4-hexenyl group, a 3-halogenated isobutenyl group, and the like. Among these, branched halogen-substituted alkenyl groups having 3 to 12 carbon atoms are preferable.

Examples of the cycloalkyl group having 3 to 20 carbon atoms that may be represented by $R^4$ and $R^5$ include a cyclopropyl group, a cyclobutyl group, a cyclopentyl group, a tetramethylcyclopentyl group, a cyclohexyl group, a methylcyclohexyl group, a cycloheptyl group, a cyclooctyl group, a cyclononyl group, a cyclodecyl group, a butylcyclopentyl group, and the like. Among these, cycloalkyl groups having 3 to 12 carbon atoms are preferable. Examples of the cycloalkenyl group having 3 to 20 carbon atoms include a cyclopropenyl group, a cyclopentenyl group, a cyclohexenyl group, a cyclooctenyl group, a norbornene group, and the like. Among these, cycloalkenyl groups having 3 to 12 carbon atoms are preferable.

Examples of the halogen-substituted cycloalkyl group having 3 to 20 carbon atoms that may be represented by $R^4$ and $R^5$ include a halogen-substituted cyclopropyl group, a halogen-substituted cyclobutyl group, a halogen-substituted cyclopentyl group, a halogen-substituted trimethylcyclopentyl group, a halogen-substituted cyclohexyl group, a halogen-substituted methylcyclohexyl group, a halogen-substituted cycloheptyl group, a halogen-substituted cyclooctyl group, a halogen-substituted cyclononyl group, a halogen-substituted cyclodecyl group, a halogen-substituted butylcyclopentyl group, and the like. Among these, halogen-substituted cycloalkyl groups having 3 to 12 carbon atoms are preferable.

Examples of the halogen-substituted cycloalkenyl group having 3 to 20 carbon atoms that may be represented by $R^4$ and $R^5$ include a halogen-substituted cyclopropenyl group, a halogen-substituted cyclobutenyl group, a halogen-substituted cyclopentenyl group, a halogen-substituted trimethylcyclopentenyl group, a halogen-substituted cyclohexenyl group, a halogen-substituted methylcyclohexenyl group, a halogen-substituted cycloheptenyl group, a halogen-substituted cyclooctenyl group, and halogen-substituted cyclononenyl group, a halogen-substituted cyclodecenyl group, a halogen-substituted butylcyclopentenyl group, and the like. Among these, halogen-substituted cycloalkenyl groups having 3 to 12 carbon atoms are preferable.

Examples of the aromatic hydrocarbon group having 6 to 24 carbon atoms that may be represented by $R^4$ and $R^5$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, and the like. Among these, aromatic hydrocarbon groups having 6 to 12 carbon atoms are preferable.

Examples of the halogen-substituted aromatic hydrocarbon group having 6 to 24 carbon atoms that may be represented by $R^4$ and $R^5$ include a phenyl halide group, a methylphenyl halide group, a methylphenyl trihalide group, a benzyl perhalide group, a phenyl perhalide group, a 2-phenyl-2-halogenated ethyl group, a naphthyl perhalide group, a 4-phenyl-2,3-dihalogenated butyl group, and the like. Among these, halogen-substituted aromatic hydrocarbon groups having 6 to 12 carbon atoms are preferable.

Examples of the halogen included in the halogen-substituted alkyl group, the halogen-substituted alkenyl group, the halogen-substituted cycloalkyl group, the halogen-substituted cycloalkenyl group, and the halogen-substituted aromatic hydrocarbon group that may be represented by $R^4$ and $R^5$ include fluorine, chlorine, bromine, and iodine. Among these, fluorine, chlorine, and bromine are preferable.

Examples of the nitrogen atom-containing hydrocarbon group having 2 to 24 carbon atoms that is terminated by a carbon atom (excluding a group that is terminated by a C═N group) that may be represented by $R^4$ and $R^5$ include alkylaminoalkyl groups such as a methylaminomethyl group, a dimethylaminomethyl group, an ethylaminomethyl group, a diethylaminomethyl group, a propylaminomethyl group, a dipropylaminomethyl group, a methylaminoethyl group, a dimethylaminoethyl group, an ethylaminoethyl group, a diethylaminoethyl group, a propylaminoethyl group, a dipropylaminoethyl group, a butylaminoethyl group, a dibutylaminoethyl group, a pentylaminoethyl group, a dipentylaminoethyl group, a hexylaminoethyl group, a hexylmethylaminoethyl group, a heptylmethylaminoethyl group, a diheptylaminomethyl group, an octylmethylaminomethyl group, a dioctylaminoethyl group, a nonylaminomethyl group, a dinonylaminomethyl group, a decylaminomethyl group, a didecylamino group, a cyclohexylaminomethyl group, and a dicyclohexylaminomethyl group, arylaminoalkyl groups and alkylarylaminoalkyl groups such as a phenylaminomethyl group, a diphenylaminomethyl group, a ditolylaminomethyl group, a dinaphthylaminomethyl group, and a methylphenylaminoethyl group, polycyclic aminoalkyl groups, amino group-containing aromatic hydrocarbon groups such as an anilino group, a dimethylaminophenyl group, and a bisdimethylaminophenyl group, iminoalkyl groups such as a methyliminomethyl group, an ethyliminoethyl group, a propylimino group, a butylimino group, and a phenylimino group, and the like. Among these, nitrogen atom-containing hydrocarbon groups having 2 to 12 carbon atoms are preferable. Note that the expression "terminated by" used herein in connection with $R^4$ and $R^5$ means that $R^4$ or $R^5$ is bonded to the adjacent oxygen atom through an atom or a group by which $R^4$ or $R^5$ is terminated.

Examples of the oxygen atom-containing hydrocarbon group having 2 to 24 carbon atoms that is terminated by a carbon atom (excluding a group that is terminated by a carbonyl group) that may be represented by $R^4$ and $R^5$ include ether group-containing hydrocarbon groups such as a methoxymethyl group, an ethoxymethyl group, a propoxymethyl group, a butoxymethyl group, an isopropoxymethyl group, an isobutoxymethyl group, a methoxyethyl group, an ethoxyethyl group, a propoxyethyl group, a butoxyethyl group, an isopropoxyethyl group, and an isobutoxyethyl group, aryloxyalkyl groups such as a phenoxymethyl group, a methylphenoxymethyl group, a dimethylphenoxymethyl group, and a naphthoxymethyl group, alkoxyaryl groups such as a methoxyphenyl group and an ethoxyphenyl group, an acetoxymethyl group, and the like. Among these, oxygen atom-containing hydrocarbon groups having 2 to 12 carbon atoms are preferable. Note that the expression "terminated by" used herein in connection with $R^4$ and $R^5$ means that $R^4$ or $R^5$ is bonded to the adjacent oxygen atom through an atom or a group by which $R^4$ or $R^5$ is terminated.

Examples of the phosphorus-containing hydrocarbon group having 2 to 24 carbon atoms that is terminated by a carbon atom (excluding a group that is terminated by a C=P group) that may be represented by $R^4$ and $R^5$ include dialkylphosphinoalkyl groups such as a dimethylphosphinomethyl group, a dibutylphosphinomethyl group, a dicyclohexylphosphinomethyl group, a dimethylphosphinoethyl group, a dibutylphosphinoethyl group, and a dicyclohexylphosphinoethyl group, diarylphosphinoalkyl groups such as a diphenylphosphinomethyl group and a ditolylphosphinomethyl group, phosphino group-substituted aryl groups such as a dimethylphosphinophenyl group and a diethylphosphinophenyl group, and the like. Among these, phosphorus-containing hydrocarbon groups having 2 to 12 carbon atoms are preferable. Note that the expression "terminated by" used herein in connection with $R^4$ and $R^5$ means that $R^4$ or $R^5$ is bonded to the adjacent oxygen atom through an atom or a group by which $R^4$ or $R^5$ is terminated.

$R^5$ is particularly preferably a linear alkyl group having 1 to 12 carbon atoms, a branched alkyl group having 3 to 12 carbon atoms that is terminated by —$CH_2$—, a vinyl group, a linear alkenyl group having 3 to 12 carbon atoms, a branched alkenyl group having 3 to 12 carbon atoms that is terminated by —$CH_2$—, a linear halogen-substituted alkyl group having 1 to 12 carbon atoms, a branched halogen-substituted alkyl group having 3 to 12 carbon atoms that is terminated by —$CH_2$—, a linear halogen-substituted alkenyl group having 3 to 12 carbon atoms, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—. Note that the expression "terminated by" used herein in connection with $R^5$ means that $R^5$ is bonded to the adjacent oxygen atom through a group by which $R^5$ is terminated.

Z in the general formula (2) is a divalent linking group that bonds the carbonate group and the ether group ($OR^5$). The two oxygen atoms bonded to Z (i.e., bonded through Z) are bonded through a carbon chain. The carbon chain includes two carbon atoms. When Z is a cyclic group (e.g., cycloalkylene group, cycloalkenylene group, halogen-substituted cycloalkylene group, halogen-substituted cycloalkenylene group, aromatic hydrocarbon group, or halogen-substituted aromatic hydrocarbon group), the two oxygen atoms bonded to Z may be bonded through two carbon atoms that form the cyclic group.

Z is preferably a linear alkylene group having 1 to 20 carbon atoms, a branched alkylene group having 3 to 20 carbon atoms, a vinylene group, a linear or branched alkenylene group having 3 to 20 carbon atoms, a linear halogen-substituted alkylene group having 1 to 20 carbon atoms, a branched halogen-substituted alkylene group having 3 to 20 carbon atoms, a linear or branched halogen-substituted alkenylene group having 3 to 20 carbon atoms, a cycloalkylene group having 3 to 20 carbon atoms, a cycloalkenylene group having 3 to 20 carbon atoms, a halogen-substituted cycloalkylene group having 3 to 20 carbon atoms, a halogen-substituted cycloalkenylene group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 1 to 24 carbon atoms, an oxygen atom-containing hydrocarbon group having 1 to 24 carbon atoms, or a phosphorus-containing hydrocarbon group having 1 to 24 carbon atoms.

Z is particularly preferably a linear alkylene group having 2 carbon atoms, a branched alkylene group having 3 to 12 carbon atoms, a vinylene group, a linear or branched alkenylene group having 3 to 12 carbon atoms, a linear halogen-substituted alkylene group having 2 to 12 carbon atoms, a branched halogen-substituted alkylene group having 3 to 12 carbon atoms, a linear or branched halogen-substituted alkenylene group having 3 to 12 carbon atoms, a cycloalkylene group having 3 to 12 carbon atoms, a cycloalkenylene group having 3 to 12 carbon atoms, a halogen-substituted cycloalkylene group having 3 to 12 carbon atoms, a halogen-substituted cycloalkenylene group having 3 to 12 carbon atoms, an aromatic hydrocarbon group having 6 to 12 carbon atoms, a halogen-substituted aromatic hydrocarbon group having 6 to 12 carbon atoms, a nitrogen atom-containing hydrocarbon group having 2 to 12 carbon atoms, an oxygen atom-containing hydrocarbon group having 2 to 12 carbon atoms, or a phosphorus-containing hydrocarbon group having 2 to 12 carbon atoms. It is particularly preferable that the two oxygen atoms bonded to Z be bonded through a carbon chain that includes two carbon atoms.

Examples of the linear alkylene group having 1 to 20 carbon atoms that may be represented by Z include an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, and the like. Among these, linear alkylene groups having 2 to 12 carbon atoms are preferable.

Examples of the branched alkylene group having 3 to 20 carbon atoms that may be represented by Z include a 1-methylethylene group, a 2-methyltrimethylene group, a 2-methyltetramethylene group, a 2-methylpentamethylene group, a 3-methylhexamethylene group, a 4-methylheptamethylene group, a 4-methyloctamethylene group, a 5-methylnonamethylene group, a 5-methyldecamethylene group, a 6-methylundecamethylene group, a 7-methyldodecamethylene group, a 7-methyltridecamethylene group, and the like. Among these, branched alkylene groups having 3 to 12 carbon atoms are preferable.

Examples of the linear alkenylene group having 3 to 20 carbon atoms that may be represented by Z include a propenylene group, a butenylene group, a hexenylene group, an octenylene group, an octadecenylene group, and the like. Among these, linear alkenylene groups having 3 to 12 carbon atoms are preferable.

Examples of the branched alkenylene group having 3 to 20 carbon atoms that may be represented by Z include a 2-methylpropenylene group,
a 2,2-dimethylbutenylene group, a 3-methyl-2-butenylene group, a 3-ethyl-2-butenylene group, a 2-methyloctenylene group, a 2,4-dimethyl-2-butenylene group, and the like. Among these, branched alkenylene groups having 3 to 12 carbon atoms are preferable.

Examples of the linear halogen-substituted alkylene group having 1 to 20 carbon atoms that may be represented by Z include a dichloromethylene group, a chloromethylene group, a dichloroethylene group, a tetrachloroethylene group, and the like. Among these, linear halogen-substituted alkylene groups having 3 to 12 carbon atoms are preferable.

Examples of the branched halogen-substituted alkylene group having 1 to 20 carbon atoms that may be represented by Z include a 1,2-bischloromethylethylene group, a 2,2-bis (chloromethyl)propylene group, a 1,2-bisdichloromethylethylene group, a 1,2-bis(trichloromethyl)ethylene group, a 2,2-dichloropropylene group, a 1,1,2,2-tetrachloroethylene group, a 1-trifluoromethylethylene group, a 1-pentafluorophenylethylene group, and the like. Among these, branched halogen-substituted alkylene groups having 3 to 12 carbon atoms are preferable.

Examples of the linear halogen-substituted alkenylene group having 1 to 20 carbon atoms that may be represented by Z include a dichloroethenylene group, a difluoroethenylene group, a 3,3-dichloropropenylene group, a 1,2-difluoropropenylene group, and the like. Among these, linear halogen-substituted alkenylene groups having 3 to 12 carbon atoms are preferable.

Examples of the branched halogen-substituted alkylene group having 1 to 20 carbon atoms that may be represented by Z include a 3,4-dichloro-1,2-butylene group, 2,2-dichloro-1,3-butylene group, a 1,2-difluoro-1,2-propylene group, and the like. Among these, branched halogen-substituted alkylene groups having 3 to 12 carbon atoms are preferable.

Examples of the cycloalkylene group having 3 to 20 carbon atoms that may be represented by Z include a cyclopentylene group, a cyclohexylene group, a cyclopropylene group, a 2-methylcyclopropylene group, a cyclobutylene group, a 2,2-dimethylcyclobutylene group, a 2,3-dimethylcyclopentylene group, a 1,3,3-trimethylcyclohexylene group, a cyclooctylene group, and the like. Among these, cycloalkylene groups having 3 to 12 carbon atoms are preferable.

Examples of the cycloalkenylene group having 3 to 20 carbon atoms that may be represented by Z include a cyclopentenylene group, a 2,4-cyclopentadienylene group, a cyclohexenylene group, a 1,4-cyclohexadienylene group, a cycloheptenylene group, a methylcyclopentenylene group, a methylcyclohexenylene group, a methylcycloheptenylene group, a dicyclodecylene group, a tricyclodecylene group, and the like. Among these, cycloalkenylene groups having 3 to 12 carbon atoms are preferable.

Examples of the halogen-substituted cycloalkylene group having 3 to 20 carbon atoms that may be represented by Z include a 3-chloro-1,2-cyclopentylene group, a 3,4,5,6-tetrachloro-1,2-cyclohexylene group, a 3,3-dichloro-1,2-cyclopropylene group, a 2-chloromethylcyclopropylene group, a 3,4-dichloro-1,2-cyclobutylene group, a 3,3-bis(dichloromethyl)-1,2-cyclobutylene group, a 2,3-bis(dichloromethyl) cyclopentylene group, a 1,3,3-tris(fluoromethyl)-1,2-cyclohexylene group, a 3-trichloromethyl-1,2-cyclooctylene group, and the like. Among these, halogen-substituted cycloalkylene groups having 3 to 12 carbon atoms are preferable.

Examples of the halogen-substituted cycloalkenylene group having 3 to 20 carbon atoms that may be represented by Z include a 5-chloro-1,2-cyclo-4-hexenylene group, a 3,3,4,4-tetrafluoro-1,2-cyclo-6-octenylene group, and the like. Among these, halogen-substituted cycloalkenylene groups having 3 to 12 carbon atoms are preferable.

Examples of the aromatic hydrocarbon group having 6 to 24 carbon atoms that may be represented by Z include a 1,2-phenylene group, a 3-methyl-1,2-phenylene group, a 3,6-dimethyl-1,2-phenylene group, a 1,2-naphthylene group, a 2,3-naphthylene group, a 5-methyl-1,2-naphthylene group, a 9,10-phenanthrylene group, a 1,2-anthracenylene group, and the like. Among these, aromatic hydrocarbon groups having 6 to 12 carbon atoms are preferable.

Examples of the halogen-substituted aromatic hydrocarbon group having 6 to 24 carbon atoms that may be represented by Z include a 3-chloro-1,2-phenylene group, a 3-chloromethyl-1,2-phenylene group, a 3,6-dichloro-1,2-phenylene group, a 3,6-dichloro-4,5-dimethyl-1,2-phenylene group, a 3-chloro-1,2-naphthylene group, a 3-fluoro-1,2-naphthylene group, a 3,6-dichloro-1,2-phenylene group, a 3,6-difluoro-1,2-phenylene group, a 3,6-dibromo-1,2-phenylene group, a 1-chloro-2,3-naphthylene group, a 5-chloro-1,2-naphthylene group, a 2,6-dichloro-9,10-phenanthrylene group, a 5,6-dichloro-1,2-anthracenylene group, a 5,6-difluoro-1,2-anthracenylene, and the like. Among these, halogen-substituted aromatic hydrocarbon groups having 6 to 12 carbon atoms are preferable.

Examples of the nitrogen atom-containing hydrocarbon group having 1 to 24 carbon atoms that may be represented by Z include a 1-dimethylaminoethylene group, a 1,2-bisdimethylaminoethylene group, a 1-diethylaminoethylene group, a 2-diethylamino-1,3-propylene group, a 2-ethylamino-1,3-propylene group, a 4-dimethylamino-1,2-phenylene group, a 4,5-bis(dimethylamino)phenylene group, and the like. Among these, nitrogen atom-containing hydrocarbon groups having 2 to 12 carbon atoms are preferable.

Examples of the oxygen atom-containing hydrocarbon group having 1 to 24 carbon atoms that may be represented by Z include a 1-methoxyethylene group, a 2,2-dimethoxy-1,3- propanylene group, a 2-ethoxy-1,3-propanylene group, a 2-t-butoxy-1,3-propanylene group, a 2,3-dimethoxy-2,3-butylene group, a 4-methoxy-1,2-phenylene group, and the like. Among these, oxygen atom-containing hydrocarbon groups having 2 to 12 carbon atoms are preferable.

Examples of the phosphorus-containing hydrocarbon group having 1 to 24 carbon atoms that may be represented by Z include a 1-dimethylphosphinoethylene group, a 2,2-bis(dimethylphosphino)-1,3-propanylene group, a 2-diethylphosphino-1,3-propanylene group, a 2-t-butoxymethylphosphino-1,3-propanylene group, a 2,3-bis(diphenylphospino)-2,3-butylene group, a 4-methylphosphate-1,2-phenylene group, and the like. Among these, phosphorus-containing hydrocarbon groups having 1 to 12 carbon atoms are preferable.

Specific examples of the compound represented by the general formula (2) include 2-methoxyethyl methyl carbonate, 2-ethoxyethyl methyl carbonate, 2-propoxyethyl methyl carbonate, 2-(2-ethoxyethyloxyl)ethyl methyl carbonate, 2-benzyloxyethyl methyl carbonate, 2-methoxypropyl methyl carbonate, 2-ethoxypropyl methyl carbonate, 2-methyl(2-methoxy)butyl methyl carbonate, 2-methyl(2-ethoxy)butyl methyl carbonate, 2-methyl(2-methoxy)pentyl methyl carbonate, 2-methyl(2-ethoxy)pentyl methyl carbonate, 1-phenyl(2-methoxy) propyl methyl carbonate, 1-phenyl(2-ethoxy) propyl methyl carbonate, 1-phenyl(2-benzyloxy)propyl methyl carbonate, 1-phenyl(2-methoxy)ethyl methyl carbonate, 1-phenyl(2-ethoxy)ethyl methyl carbonate, 1-methyl-1-phenyl(2-methoxy)ethyl methyl carbonate, 1-methyl-1-phenyl(2-ethoxy)ethyl methyl carbonate, 1-methyl-1-phenyl(2-benzyloxy)ethyl methyl carbonate, 1-methyl-1-phenyl(2-(2-ethoxyethyloxy))ethyl methyl carbonate, 2-methoxyethyl ethyl carbonate, 2-ethoxyethyl ethyl carbonate, 1-phenyl(2-methoxy)ethyl ethyl carbonate, 1-phenyl(2-ethoxy)ethyl ethyl carbonate, 1-phenyl(2-propoxy)ethyl ethyl carbonate, 1-phenyl(2-butoxy)ethyl ethyl carbonate, 1-phenyl(2-isobutyloxy)ethyl ethyl carbonate, 1-phenyl(2-(2-ethoxyethyloxy))ethyl ethyl carbonate, 1-methyl-1-phenyl(2-methoxy)ethyl ethyl carbonate, 1-methyl-1-phenyl(2-ethoxy)ethyl ethyl carbonate, 1-methyl-1-phenyl(2-propoxy)ethyl ethyl carbonate, 1-methyl-1-phenyl(2-butoxy)ethyl ethyl carbonate, 1-methyl-1-phenyl(2-isobutyloxy)ethyl ethyl carbonate, 1-methyl-1-phenyl(2-benzyloxy)ethyl ethyl carbonate, 1-methyl-1-phenyl(2-(2-ethoxyethyloxy))ethyl ethyl carbonate, 2-methoxyethyl phenyl carbonate, 2-ethoxyethyl phenyl carbonate, 2-propoxyethyl phenyl carbonate, 2-butoxyethyl phenyl carbonate, 2-isobutyloxyethyl phenyl carbonate, 2-benzyloxyethyl phenyl carbonate, 2-(2-ethoxyethyloxyl)ethyl phenyl carbonate, 2-methoxyethyl p-methylphenyl carbonate, 2-ethoxyethyl p-methylphenyl carbonate, 2-propoxyethyl p-methylphenyl carbonate, 2-butoxyethyl p-methylphenyl carbonate, 2-isobutyloxyethyl p-methylphenyl carbonate, 2-benzyloxyethyl p-methylphenyl carbonate, 2-(2-ethoxyethyloxyl)ethyl p-methylphenyl carbonate, 2-methoxyethyl o-methylphenyl carbonate, 2-ethoxyethyl o-methylphenyl carbonate, 2-propoxyethyl o-methylphenyl carbonate, 2-butoxyethyl o-methylphenyl carbonate, 2-isobutyloxyethyl o-methylphenyl carbonate, 2-benzyloxyethyl o-methylphenyl carbonate, 2-(2-ethoxyethyloxyl)ethyl o-methylphenyl carbonate, 2-methoxyethyl o,p-dimethylphenyl carbonate, 2-ethoxyethyl o,p-dimethylphenyl carbonate, 2-propoxyethyl o,p-dimethylphenyl carbonate, 2-butoxyethyl o,p-dimethylphenyl carbonate, 2-isobutyloxyethyl o,p-dimethylphenyl carbonate, 2-benzyloxyethyl o,p-dimethylphenyl carbonate, 2-(2-ethoxyethyloxyl)ethyl o,p-dimethylphenyl carbonate, 2-methoxypropyl phenyl carbonate, 2-ethoxypropyl phenyl carbonate, 2-propoxypropyl phenyl carbonate, 2-butoxypropyl phenyl carbonate, 2-isobutyloxypropyl phenyl carbonate, 2-(2-ethoxyethyloxyl)propyl phenyl carbonate, 2-phenyl(2-methoxy)ethyl phenyl carbonate, 2-phenyl(2-ethoxy)ethyl phenyl carbonate, 2-phenyl(2-propoxy)ethyl phenyl carbonate, 2-phenyl(2-butoxy)ethyl phenyl carbonate, 2-phenyl(2-isobutyloxy)ethyl phenyl carbonate, 2-phenyl(2-(2-ethoxyethyloxy))ethyl phenyl carbonate, 1-phenyl(2-methoxy)propyl phenyl carbonate, 1-phenyl(2-ethoxy)propyl phenyl carbonate, 1-phenyl(2-propoxy)propyl phenyl carbonate, 1-phenyl(2-isobutyloxy)propyl phenyl carbonate, 1-phenyl(2-methoxy)ethyl phenyl carbonate, 1-phenyl(2-ethoxy)ethyl phenyl carbonate, 1-phenyl(2-propoxy)ethyl phenyl carbonate, 1-phenyl(2-butoxy)ethyl phenyl carbonate, 1-phenyl(2-isobutyloxy)ethyl phenyl carbonate, 1-phenyl(2-(2-ethoxyethyloxy))ethyl phenyl carbonate, 1-methyl-1-phenyl(2-methoxy)ethyl phenyl carbonate, 1-methyl-1-phenyl(2-ethoxy)ethyl phenyl carbonate, 1-methyl-1-phenyl(2-propoxy)ethyl phenyl carbonate, 1-methyl-1-phenyl(2-butoxy)ethyl phenyl carbonate, 1-methyl-1-phenyl(2-isobutyloxy)ethyl phenyl carbonate, 1-methyl-1-phenyl(2-benzyloxy)ethyl phenyl carbonate, and 1-methyl-1-phenyl(2-(2-ethoxyethyloxy))ethyl phenyl carbonate. The compound represented by the general formula (2) is particularly preferably one compound, or two or more compounds, selected from 2-ethoxyethyl methyl carbonate, 2-ethoxyethyl ethyl carbonate, 2-propoxyethyl propyl carbonate, 2-butoxyethyl butyl carbonate, 2-butoxyethyl ethyl carbonate, 2-ethoxyethyl propyl carbonate, 2-ethoxyethyl phenyl carbonate, and 2-ethoxyethyl p-methylphenyl carbonate. Among these, (2-ethoxyethyl) methyl carbonate, (2-ethoxyethyl) ethyl carbonate, and (2-ethoxyethyl) phenyl carbonate are particularly preferable. Note that the compounds represented by the general formula (1) may be used either alone or in combination, and the compounds represented by the general formula (2) may be used either alone or in combination.

The solid catalyst component (I) according to one embodiment of the invention may include an electron donor compound (hereinafter may be referred to as "component (E)") other than the component (A) represented by the general formula (1) and the component (B) represented by the general formula (2). Examples of the component (E) include acid halides, acid amides, nitriles, acid anhydrides, diether compounds, organic acid esters, and the like. Examples of the component (E) include aliphatic dicarboxylic acid diesters such as a succinic acid diester, a maleic acid diester, a malonic acid diester, and
a glutaric acid diester, alicyclic dicarboxylic acid diesters such as a cycloalkanedicarboxylic acid diester and a cycloalkenedicarboxylic acid diester, a compound that includes an ester group and an ether group, a diether compound, and the like. The component (E) is preferably a malonic acid diester (e.g., dimethyl malonate and diethyl malonate),
a hydrocarbon-substituted malonic acid diester (e.g., dimethyl diisobutylmalonate, diethyl diisobutylmalonate, and diethyl benzylidenemalonate), a maleic acid diester (e.g., diethyl maleate and di-n-butyl maleate), a cycloalkanedicarboxylic acid diester (e.g., diethyl cyclohexane-1,2-dicarboxylate and dibutyl cyclohexane-1,2-dicarboxylate), or a 1,3-diether (e.g., 9,9-bis(methoxymethyl)fluorene). Note that these compounds may be used in combination as the component (E).

The solid catalyst component (I) according to one embodiment of the invention may include a polysiloxane (hereinafter may be referred to as "component (F)"). The stereoregularity or the crystallinity of the resulting polymer can be improved, and production of a fine powder can be reduced by utilizing the polysiloxane. The term "polysiloxane" used herein refers to a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm$^2$/s (2 to 10,000 cSt), and preferably 0.03 to 5 cm$^2$/s (3 to 500 cSt).

Examples of the chain-like polysiloxane include disiloxanes such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, 1,3-bis(chloromethyl)tetramethyldisiloxane, dimethylpolysiloxane, and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

The solid catalyst component (I) according to one embodiment of the invention may include a reagent that includes silicon, phosphorus, or a metal (e.g., aluminum) in addition to the above components. Examples of such a reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable. When the solid catalyst component (I) includes such a reagent, the polymerization activity of the resulting solid catalyst component, and the stereoregularity of the resulting polymer can be improved.

Examples and specific examples of the organosilicon compound that includes an Si—O—C linkage and the organosilicon compound that includes an Si—N—C linkage include those mentioned later in connection with the organosilicon compound represented by the general formula (4) and the organosilicon compound represented by the general formula (5). Examples of the organoaluminum compound include those mentioned later in connection with the organoaluminum compound represented by the general formula (3). These reagents may be used either alone or in combination.

The solid catalyst component (I) that includes the reagent may further include an organosilicon compound represented by the following general formula (8) that includes an unsaturated alkyl group.

  (8)

wherein R$^{17}$ is a hydrogen atom, an alkyl group having 1 to 20 carbon atoms, a cycloalkyl group, a phenyl group, a vinyl group, or a halogen atom, provided that a plurality of R$^{17}$ are either identical or different when a plurality of R$^{17}$ are present, u is an integer from 0 to 5, and t is an integer from 1 to 4. In this case, the polymerization activity of the resulting solid catalyst component, and activity (response) with respect to hydrogen can be further improved.

The term "unsaturated alkyl group" used herein refers to a vinyl group or an alkenyl group. Examples of the organosilicon compound that includes an unsaturated alkyl group include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by CH$_2$=CH—, and the alkenyl group is represented by CH$_2$=CH—(CH$_2$)$_u$—. Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenyldimethylsilane, diallyldichlorosilane, and allyltriethylsilane are particularly preferable. These organosilicon compounds that include an unsaturated alkyl group may be used either alone or in combination.

The content of titanium, magnesium, the halogen atom, the component (A), and the component (B) in the solid catalyst component (I) according to one embodiment of the invention is not particularly limited. The content of titanium in the solid catalyst component (I) is preferably 0.1 to 10 wt %, more preferably 0.5 to 8.0 wt %, and still more preferably 1.0 to 8.0 wt %. The content of magnesium in the solid catalyst component (I) is preferably 10 to 40 wt %, more preferably 10 to 30 wt %, and particularly preferably 13 to 25 wt %. The content of the halogen atom in the solid catalyst component (I) is preferably 20 to 89 wt %, more preferably 30 to 85 wt %, and particularly preferably 40 to 75 wt %. The total content of the component (A) and the component (B) (when the component (I) does not include the electron donor compound (E)), or the total content of the component (A), the component (B), and the electron donor compound (E) (when the component (I) includes the electron donor compound (E)) is preferably 0.5 to 40 wt %, more preferably 1 to 30 wt %, and particularly preferably 2 to 25 wt %. When the component (I) includes the electron donor compound (E), the molar ratio of the content of the component (D) to the total content of the component (A) and the component (B) is 0.01 to 50, preferably 0.1 to 10, and more preferably 0.2 to 5. The molar ratio of the content of the component (A) to the total content of the component (A) and the component (B) is 0.05 to 0.995, and preferably 0.1 to 0.9.

Method for Producing Solid Catalyst Component (I) for Olefin Polymerization

The solid catalyst component (I) for olefin polymerization according to one embodiment of the invention is produced by bringing a magnesium compound, a titanium compound, an optional halogen compound other than the titanium compound, the compound (A) represented by the general formula (1), and the compound (B) represented by the general formula (2) into contact with each other.

The magnesium compound (C) (hereinafter may be referred to as "component (C)") used to produce the solid catalyst component according to one embodiment of the invention may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be produced by reacting magnesium metal with an alcohol in the presence of a halogen, a halogen-containing metal compound, or the like. These dialkoxymagnesiums may be used either alone or in combination.

It is preferable to use a granular or powdery dialkoxymagnesium when producing the solid catalyst component according to one embodiment of the invention. The dialkoxymagnesium may have an indefinite shape or a spherical shape. For example, when using a spherical dialkoxymagnesium, a polymer powder obtained by polymerization has a better particle shape and a narrower particle size distribution. This makes it possible to improve the handling capability of the polymer powder during polymerization, and eliminate problems such as clogging due to fine particles included in the polymer powder.

The spherical dialkoxymagnesium need not necessarily have a perfect spherical shape, but may have an elliptical shape or a potato-like shape. The ratio (l/w) of the major axis diameter l to the minor axis diameter w of the spherical dialkoxymagnesium is 3 or less, preferably 1 to 2, and more preferably 1 to 1.5.

The average particle size D50 (i.e., the particle size at 50% in the cumulative volume particle size distribution) of the dialkoxymagnesium measured using a laser diffraction/scattering particle size distribution analyzer is preferably 1 to 200 µm, and more preferably 5 to 150 µm. The average particle size of the spherical dialkoxymagnesium is preferably 1 to 100 µm, more preferably 5 to 50 µm, and still more preferably 10 to 40 µm. It is preferable that the spherical dialkoxymagnesium have a narrow particle size distribution, and have a low fine particle content and a low coarse particle content. More specifically, it is preferable that the spherical dialkoxymagnesium have a content of particles having a particle size (measured using a laser diffraction/scattering particle size distribution analyzer) equal to or less than 5 µm of 20% or less, and more preferably 10% or less. It is preferable that the spherical dialkoxymagnesium have a content of particles having a particle size equal to or more than 100 µm of 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

The component (C) may be used in the form of a magnesium compound solution or a magnesium compound suspension. When the component (C) is solid, the component (C) is dissolved in a solvent that can dissolve the component (C) to prepare a magnesium compound solution, or suspended in a solvent that cannot dissolve the component (C) to prepare a magnesium compound suspension. When the component (C) is liquid, the component (C) may be used directly as a magnesium compound solution, or may be dissolved in a solvent that can dissolve a magnesium compound to prepare a magnesium compound solution.

Examples of a compound that can dissolve the solid component (C) include at least one compound selected from the group consisting of alcohols, ethers, and esters. Specific examples of the compound that can dissolve the solid component (C) include alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol, halogen-containing alcohols having 1 to 18 carbon atoms, such as trichloromethanol, trichloroethanol, and trichlorohexanol, ethers having 2 to 20 carbon atoms, such as methyl ether, ethyl ether, isopropyl ether, butyl ether, amyl ether, tetrahydrofuran, ethyl benzyl ether, dibutyl ether, anisole, and diphenyl ether, metal acid esters such as tetraethoxytitanium, tetra-n-propoxytitanium, tetraisopropoxytitanium, tetrabutoxytitanium, tetrahexoxytitanium, tetrabutoxyzirconium, and tetraethoxyzirconium, and the like. Among these, alcohols such as ethanol, propanol, butanol, and 2-ethylhexanol are preferable, and 2-ethylhexanol is particularly preferable.

A saturated hydrocarbon solvent or an unsaturated hydrocarbon solvent that does not dissolve a magnesium compound is used as a medium that cannot dissolve the component (C). The saturated hydrocarbon solvent or the unsaturated hydrocarbon solvent is safe, and has high industrial versatility. Examples of the saturated hydrocarbon solvent or the unsaturated hydrocarbon solvent include linear or branched aliphatic hydrocarbon compounds having a boiling point of 50 to 200° C., such as hexane, heptane, decane, and methylheptane, alicyclic hydrocarbon compounds having a boiling point of 50 to 200° C., such as cyclohexane, ethylcyclohexane, and decahydronaphthalene, and aromatic hydrocarbon compounds having a boiling point of 50 to 200° C., such as toluene, xylene, and ethylbenzene. Among these, linear aliphatic hydrocarbon compounds having a boiling point of 50 to 200° C., such as hexane, heptane, and decane, and aromatic hydrocarbon compounds having a boiling point of 50 to 200° C., such as toluene, xylene, and ethylbenzene, are preferable. These solvents may be used either alone or in combination.

Examples of the titanium compound (D) (hereinafter may be referred to as "component (D)") used to produce the component (I) according to one embodiment of the invention include a tetravalent titanium compound represented by the following general formula (7).

$$\text{Ti(OR}^{16})_j X_{4-j} \qquad (7)$$

wherein $R^{16}$ is a hydrocarbon group having 1 to 10 carbon atoms, provided that a plurality of $R^{16}$ are either identical or different when a plurality of $R^{16}$ are present, X is a halogen atom, provided that a plurality of X are either identical or different when a plurality of X are present, and j is an integer from 0 to 4.

The tetravalent titanium compound represented by the general formula (7) is one compound, or two or more compounds, selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in combination. The tetravalent titanium compound represented by the general formula (7) may be used in a state in which the tetravalent titanium compound is diluted with a hydrocarbon compound, a halogenated hydrocarbon compound, or the like.

A halogen compound other than the component (D) may optionally be used when producing the solid catalyst component (I). Examples of the halogen compound include a tetravalent halogen-containing silicon compound. Specific examples of the halogen compound include silane tetrahalides such as tetrachlorosilane (silicon tetrachloride) and tetrabromosilane, and alkoxy group-containing halogenated silanes such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

The component (A) and the component (B) used to produce the solid catalyst component (I) according to one embodiment of the invention are the same as the component (A) and the component (B) included in the solid catalyst component (I) according to one embodiment of the invention, and description thereof is omitted. The electron donor compound (E) other than the component (A) that is optionally used when producing the solid catalyst component (I) according to one embodiment of the invention is the same as the electron donor compound (E) that is optionally included in the solid catalyst component (I) according to one embodiment of the invention, and description thereof is omitted. The component (F) that is optionally used when producing the solid catalyst component (I) according to one embodiment of the invention is the same as the component (F) that is optionally included in the solid catalyst component (I) according to one embodiment of the invention, and description thereof is omitted.

The solid catalyst component (I) may preferably be produced using a method that co-grinds a solid magnesium compound that does not have a reducing capability, the component (A), the component (B), and a titanium halide, a method that brings a magnesium halide compound that includes an alcohol or the like, the component (A), the component (B), and a titanium halide into contact with each other in the presence of an inert hydrocarbon solvent, a method that brings a dialkoxymagnesium, the component (A), the component (B), and a titanium halide into contact with each other in the presence of an inert hydrocarbon solvent, a method that brings a magnesium compound having a reducing capability, the component (A), the component (B), and a titanium halide into contact with each other to precipitate a solid catalyst, or the like.

Specific examples of the method for producing the solid catalyst component (I) for olefin polymerization are described below. When implementing the following methods (1) to (16), the electron donor compound (E) other than the component (A) and the component (B) may be used in combination with the component (A) and the component (B). The components may be brought into contact with each other in the presence of a reagent (e.g., silicon, phosphorus, or aluminum) or a surfactant.

(1) A magnesium halide is dissolved in an alkthytitanium compound, and an organosilicon compound is brought into contact with the solution to obtain a solid product. The solid product is reacted with a titanium halide, and the component (A) and the component (B) are brought into contact with (reacted with) the resulting product to produce the solid catalyst component (I) for olefin polymerization. In this case, the component (I) may be subjected to preliminary polymerization using an organoaluminum compound, an organosilicon compound, and an olefin.

(2) A magnesium halide and an alcohol are reacted to obtain a homogeneous solution, and a carboxylic anhydride is brought into contact with the homogeneous solution. A titanium halide, the component (A), and the component (B) are brought into contact with (reacted with) the solution to obtain a solid, and a titanium halide is brought into contact with the solid to produce the solid catalyst component (I) for olefin polymerization.

(3) Magnesium metal, butyl chloride, and a dialkyl ether are reacted to synthesize an organomagnesium compound, and an alkoxytitanium is brought into contact with (reacted with) the organomagnesium compound to obtain a solid product. The component (A), the component (B), and a titanium halide are brought into contact with (reacted with) the solid product to produce the solid catalyst component (I) for olefin polymerization. In this case, the solid component may be subjected to preliminary polymerization using an organoaluminum compound, an organosilicon compound, and an olefin to produce the solid catalyst component (I) for olefin polymerization.

(4) An organomagnesium compound such as a dialkylmagnesium and an organoaluminum compound are brought into contact with (reacted with) an alcohol in the presence of a hydrocarbon solvent to obtain a homogeneous solution, and a silicon compound such as silicon tetrachloride is brought into contact with the solution to obtain a solid product. A titanium halide, the component (A), and the component (B) are brought into contact with (reacted with) the solid product in the presence of an aromatic hydrocarbon solvent, and titanium tetrachloride is brought into contact with the resulting product to produce the solid catalyst component (I) for olefin polymerization.

(5) Magnesium chloride, a tetraalkoxytitanium, and a fatty alcohol are brought into contact with each other (reacted with each other) in the presence of a hydrocarbon solvent to obtain a homogeneous solution, and a titanium halide is brought into contact with the solution. The mixture is then heated to precipitate a solid, and the component (A) and the component (B) are brought into contact with the solid. The mixture is then reacted with a titanium halide to produce the solid catalyst component (I) for olefin polymerization.

(6) A magnesium metal powder, an alkylmonohalogen compound, and iodine are brought into contact with each other (reacted with each other), and a tetraalkoxytitanium, an acid halide, and a fatty alcohol are reacted with the mixture in the presence of a hydrocarbon solvent to obtain a homogeneous solution. After the addition of titanium tetrachloride to the solution, the mixture is heated to precipitate a solid product, and the component (A) and the component (B) are brought into contact with the solid product. The mixture is then reacted with titanium tetrachloride to produce the solid catalyst component (I) for olefin polymerization.

(7) A dialkoxymagnesium is suspended in a hydrocarbon solvent, and brought into contact with titanium tetrachloride.

The mixture is heated, and brought into contact with the component (A) and the component (B) to obtain a solid product. The solid product is washed with a hydrocarbon solvent, and brought into contact with titanium tetrachloride in the presence of a hydrocarbon solvent to produce the solid catalyst component (I) for olefin polymerization. In this case, the solid component may be heated in the presence or absence of a hydrocarbon solvent.

(8) A dialkoxymagnesium is suspended in a hydrocarbon solvent, and brought into contact with (reacted with) a titanium halide, the component (A), and the component (B) to obtain a solid product. The solid product is washed with an inert organic solvent, and brought into contact with (reacted with) a titanium halide in the presence of a hydrocarbon solvent to produce the solid catalyst component (I) for olefin polymerization. In this case, the solid component and a titanium halide may be brought into contact with each other two or more times.

(9) A dialkoxymagnesium, calcium chloride, and an alkoxy group-containing silicon compound are co-ground. The resulting ground solid is suspended in a hydrocarbon solvent, and brought into contact with (reacted with) a titanium halide, the component (A), and the component (B). A titanium halide is brought into contact with the mixture to produce the solid catalyst component (I) for olefin polymerization.

(10) A dialkoxymagnesium, the component (A), and the component (B) are suspended in a hydrocarbon solvent, and brought into contact (reacted) with a titanium halide to obtain a solid product. The solid product is washed with a hydrocarbon solvent, and brought into contact with a titanium halide in the presence of a hydrocarbon solvent to produce the solid catalyst component (I) for olefin polymerization.

(11) An aliphatic magnesium such as magnesium stearate is brought into contact with (reacted with) a titanium halide, the component (A), and the component (B). A titanium halide is then brought into contact with the mixture to produce the solid catalyst component (I) for olefin polymerization.

(12) A dialkoxymagnesium is suspended in a hydrocarbon solvent, and brought into contact with a titanium halide. The mixture is heated, and brought into contact with (reacted with) the component (A) and the component (B) to obtain a solid product. The solid product is washed with a hydrocarbon solvent, and brought into contact with a titanium halide in the presence of a hydrocarbon solvent to produce the solid catalyst component (I) for olefin polymerization, wherein aluminum chloride is added in the suspension-contact step or the contact-reaction step.

(13) A dialkoxymagnesium, 2-ethylhexyl alcohol, and carbon dioxide are brought into contact with each other (reacted with each other) in the presence of a hydrocarbon solvent to obtain a homogeneous solution. A titanium halide, the component (A), and the component (B) are reacted with the solution to obtain a solid. The solid is dissolved in tetrahydrofuran to precipitate a solid product. A titanium halide is brought into contact with (reacted with) the solid product (optionally two or more times) to produce the solid catalyst component (I) for olefin polymerization. In this case, a silicon compound such as tetrabutoxysilane may be used in the contact-reaction step or the dissolution step.

(14) Magnesium chloride, an organic epoxy compound, and a phosphoric acid compound are suspended in a hydrocarbon solvent, and heated to obtain a homogeneous solution. A carboxylic anhydride and a titanium halide are brought into contact with (reacted with) the solution to obtain a solid product. The component (A) and the component (B) are reacted with the solid product, and the resulting reaction product is washed with a hydrocarbon solvent. A titanium halide is brought into contact with the reaction product in the presence of a hydrocarbon solvent to produce the solid catalyst component (I) for olefin polymerization.

(15) A dialkoxymagnesium, a titanium compound, the component (A), and the component (B) are brought into contact with each other (reacted with each other) in the presence of a hydrocarbon solvent, and a silicon compound such as a polysiloxane is brought into contact with (reacted with) the resulting reaction product. A titanium halide and a metal salt of an organic acid are sequentially brought into contact with (reacted with) the mixture, and a titanium halide is brought into contact with the mixture to produce the solid catalyst component (I) for olefin polymerization.

(16) A dialkoxymagnesium, the component (A), and the component (B) are suspended in a hydrocarbon solvent. The suspension is heated, and brought into contact with a silicon halide. The mixture is brought into contact with a titanium halide to obtain a solid product. The solid product is washed with a hydrocarbon solvent, and brought into contact with a titanium halide in the presence of a hydrocarbon solvent to produce the solid catalyst component (I) for olefin polymerization. In this case, the solid component may be heated in the presence or absence of a hydrocarbon solvent.

When implementing the methods (1) to (16), a titanium halide and a hydrocarbon solvent may be brought into contact with the solid catalyst component (I) (that has been washed) at 20 to 100° C., and the mixture may be heated to effect a reaction (secondary reaction), and washed with an inert organic solvent that is liquid at room temperature. This operation may be repeated 1 to 10 times. This makes it possible to further improve polymerization activity when polymerizing an olefin, and the stereoregularity of the resulting polymer.

The component (I) according to one embodiment of the invention may preferably be produced using any of the methods (1) to (16). It is preferable to use the method (1), (3), (4), (5), (7), (8), or (10), and particularly preferably the method (3), (4), (7), (8), or (10), since a solid catalyst component for olefin polymerization that ensures high stereoregularity can be obtained. It is most preferable to produce the solid catalyst component (I) by suspending a dialkoxymagnesium and the component (A) (or the component (B)) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing the component (B) (or the component (A)) into contact with the solid product in the presence of a hydrocarbon solvent.

It is also preferable to bring the solid catalyst component (I) obtained by the above method into contact with the organosilicon compound that includes an Si—O—C linkage, the organosilicon compound that includes an Si—N—C linkage, the organoaluminum compound (optional), and the organosilicon compound represented by the general formula (8) (optional), from the viewpoint of improving the polymerization activity of the solid catalyst component, and improving the hydrogen response. The solid catalyst component (I) is brought into contact with these compounds in the presence of a hydrocarbon solvent. After bringing the solid catalyst component (I) into contact with each component, the mixture is sufficiently washed with a hydrocarbon solvent in order to remove unnecessary components. The solid catalyst component (I) may be repeatedly brought into contact with these compounds.

The contact temperature is −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the invention are not adversely affected. The organosilicon compound that includes an Si—O—C linkage, the organosilicon compound that includes an Si—N—C linkage, and the organosilicon compound represented by the general formula (8) are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the residual solvent so that the weight ratio of the solvent to the solid component is ⅓ or less, and preferably ⅙ to 1/20, to obtain a powdery solid catalyst component (I).

The ratio of the components used when producing the solid catalyst component (I) differs depending on the production method. For example, the tetravalent titanium halide compound (C) is used in an amount of 0.5 to 100 mol, preferably 0.5 to 50 mol, and more preferably 1 to 10 mol, based on 1 mol of the magnesium compound (B). The component (A) and the component (B) (when the component (I) does not include the electron donor compound (E)), or the component (A), the component (B), and the electron donor compound (E) (when the component (I) includes the electron donor compound (E)), are used in a total amount of 0.01 to 10 mol, preferably 0.01 to 1 mol, and more preferably 0.02 to 0.6 mol, based on 1 mol of the magnesium compound (B). The solvent is used in an amount of 0.001 to 500 mol, preferably 0.001 to 100 mol, and more preferably 0.005 to 10 mol, based on 1 mol of the magnesium compound (B). The polysiloxane (F) is used in an amount of 0.01 to 100 g, preferably 0.05 to 80 g, and still more preferably 1 to 50 g, based on 1 mol of the magnesium compound (B).

Olefin Polymerization Catalyst

An olefin polymerization catalyst according to one embodiment of the invention is prepared by bringing the solid catalyst component (I), an organoaluminum compound (II) (hereinafter may be referred to as "component (G)"), and an external electron donor compound (III) (hereinafter may be referred to as "component (H)") into contact with each other. An olefin can be polymerized or copolymerized in the presence of the olefin polymerization catalyst. Note that the component (H) may not be used when the solid catalyst component (I) includes the organosilicon compound that includes an Si—O—C linkage, the organosilicon compound that includes an Si—N—C linkage, or the organoaluminum compound (reagent), or when the solid catalyst component that includes the reagent further includes the organosilicon compound represented by the general formula (8). Specifically, the catalyst that includes the solid catalyst component and the organoaluminum compound achieves excellent polymerization activity and excellent activity (response) with respect to hydrogen even when the component (H) is not used.

The organoaluminum compound (II) is not particularly limited as long as the organoaluminum compound (II) is a compound represented by the general formula (3). Note that $R^6$ is preferably an ethyl group or an isobutyl group, Q is preferably a hydrogen atom, a chlorine atom, a bromine atom, an ethoxy group, or a phenoxy group, and p is preferably 2, 2.5, or 3, and particularly preferably 3.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These aluminum compounds may be used either alone or in combination.

Examples of the external electron donor compound (III) used when producing the olefin polymerization catalyst according to one embodiment of the invention include an organic compound that includes an oxygen atom or a nitrogen atom. Examples of the organic compound that includes an oxygen atom or a nitrogen atom include alcohols, phenols, ethers, esters, ketones, acid halides, aldehydes, amines, amides, nitriles, isocyanates, and organosilicon compounds. The external electron donor compound (III) may be an organosilicon compound that includes an Si—O—C linkage, an aminosilane compound that includes an Si—N—C linkage, or the like.

Among these, esters such as ethyl benzoate, ethyl p-methoxybenzoate, ethyl p-ethoxybenzoate, methyl p-toluate, ethyl p-toluate, methyl anisate, and ethyl anisate, 1,3-diethers, an organosilicon compound that includes an Si—O—C linkage, and an aminosilane compound that includes an Si—N—C linkage are preferable, and an organosilicon compound that includes an Si—O—C linkage, an aminosilane compound that includes an Si—N—C linkage, and a 2-substituted 1,3-diether are particularly preferable.

Examples of the organosilicon compound that includes an Si—O—C linkage that may be used as the external electron donor compound (III) include an organosilicon compound represented by the following general formula (4).

$$R^7_q Si(OR^8)_{4-q} \qquad (4)$$

wherein $R^7$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, provided that a plurality of $R^7$ are either identical or different when a plurality of $R^7$ are present, $R^8$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^8$ are either identical or different when a plurality of $R^8$ are present, and q is an integer from 0 to 3.

Examples of the aminosilane compound that includes an Si—N—C linkage that may be used as the external electron donor compound (III) include an organosilicon compound represented by the following general formula (5).

$$(R^9 R^{10} N)_s SiR^{11}_{4-s} \qquad (5)$$

wherein $R^9$ and $R^{10}$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^9$ and $R^{10}$ are either identical or different, and optionally bond to each other to form a ring, $R^{11}$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^{11}$ are either identical or different when a plurality of $R^{11}$ are present, and s is an integer from 1 to 3.

Examples of the organosilicon compound represented by the general formula (4) or (5) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkylamino)alkoxysilanes, cycloalkyl(alkylamino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like. Specific examples of the organosilicon compound represented by the general formula (4) or (5) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethylamino)methylethylsilane, bis(ethylamino)-t-butylmethylsilane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. For example, one or more compounds selected from n-propyltriethoxysilane, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like may be used.

The 2-substituted 1,3-diether is selected from a diether compound represented by the following general formula (6).

$R^{12}OCH_2CR^{13}R^{14}CH_2OR^{15}$ (6)

wherein $R^{13}$ and $R^{14}$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^{13}$ and $R^{14}$ are either identical or different, and optionally bond to each other to form a ring, and $R^{12}$ and $R^{15}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^{12}$ and $R^{15}$ are either identical or different.

Specific examples of the 2-substituted 1,3-diether include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, and the like. Among these, 2-isopropyl-2-isobutyl-1,3-dimethoxypropane, 2-isopropyl-2-isopentyl-1,3-dimethoxypropane, 9,9-bis(methoxymethyl)fluorene, and the like are preferable. These compounds may be used either alone or in combination.

Olefin Polymerization Method

According to one embodiment of the invention, an olefin is polymerized or copolymerized in the presence of the olefin polymerization catalyst. Examples of the olefin include ethylene, propylene, 1-butene, 1-pentene, 4-methyl-1-pentene, vinylcyclohexane, and the like. These olefins may be used either alone or in combination. Among these, ethylene, propylene, and 1-butene are preferably used. Propylene is particularly preferable as the olefin.

When polymerizing propylene, propylene may be copolymerized with another olefin. Examples of the olefin that is copolymerized with propylene include ethylene, 1-butene, 1-pentene, 4-methyl-1-pentene, vinylcyclohexane, and the like. These olefins may be used either alone or in combination. In particular, ethylene and 1-butene are preferably used.

The ratio of each component is not particularly limited as long as the advantageous effects of the invention are not adversely affected. The organoaluminum compound (G) is normally used in an amount of 1 to 2000 mol, and preferably 50 to 1000 mol, per mol of the titanium atoms included in the solid catalyst component (I). The external electron donor compound (H) is normally used in an amount of 0.002 to 10 mol, preferably 0.01 to 2 mol, and particularly preferably 0.01 to 0.5 mol, per mol of the component (G).

The components may be brought into contact with each other in an arbitrary order. It is desirable to add the organoaluminum compound (G) to the polymerization system, and bring the component (I) into contact with the organoaluminum compound (G). The olefin may be polymerized in the presence or absence of an organic solvent. The olefin monomer such as propylene may be used in a gaseous state or a liquid state. The polymerization temperature is 200° C. or less, and preferably 100° C. or less, and the polymerization pressure is 10 MPa or less, and preferably 5 MPa or less. A continuous polymerization method or a batch polymerization method may be employed. The polymerization reaction may be effected in a single step, or may be effected in two or more steps.

When polymerizing the olefin using the catalyst that includes the solid catalyst component for olefin polymerization, the organoaluminum compound, and the external electron donor compound (hereinafter may be referred to as "main polymerization"), it is desirable to effect preliminary polymerization prior to the main polymerization in order to further improve catalytic activity, stereoregularity, the particle properties of the resulting polymer, and the like. The olefin that is subjected to the main polymerization, or a monomer such as styrene, may be used for the preliminary polymerization.

The components and the monomer may be brought into contact with each other in an arbitrary order when effecting the preliminary polymerization. Note that it is preferable to add the component (G) to the preliminary polymerization system containing an inert gas atmosphere or an olefin gas atmosphere, bring the solid catalyst component (I) into contact with the component (G), and then bring the olefin (e.g., propylene), or a mixture of propylene and one or more additional olefins, into contact with the mixture.

When effecting the preliminary polymerization using the component (H), it is desirable to add the component (G) to the preliminary polymerization system containing an inert gas atmosphere or an olefin gas atmosphere, bring the component (H) into contact with the component (G), bring the solid catalyst component (I) into contact with the mixture, and then bring the olefin (e.g., propylene), or a mixture of propylene and one or more additional olefins, into contact with the mixture.

When producing a propylene block copolymer, multistep polymerization including two or more polymerization steps is effected. Propylene is normally polymerized in the first step in the presence of the polymerization catalyst, and ethylene and propylene are normally copolymerized in the second step. It is also possible to copolymerize or homopolymerize an α-olefin other than propylene in the second or subsequent polymerization step. Examples of the α-olefin include ethylene, 1-butene, 4-methyl-1-pentene, vinylcyclohexane, 1-hexene, 1-octene, and the like. More specifically, propylene is polymerized in the first step while adjusting the polymerization temperature and the polymerization time so that the content of a polypropylene part is 20 to 80 wt %, and ethylene and propylene or another α-olefin are polymerized in the second step so that the content of a rubber part (e.g., ethylene-propylene rubber (EPR)) is 20 to 80 wt %. The polymerization temperature in the first step and the second step is 200° C. or less, and preferably 100° C. or less, and the polymerization pressure in the first step and the second step is 10 MPa or less, and preferably 5 MPa or less. The polymerization time in each polymerization step (or the residence time when effecting continuous polymerization) is normally 1 minute to 5 hours.

Examples of the polymerization method include a slurry polymerization method that utilizes an inert hydrocarbon compound (e.g., cyclohexane or heptane) as a solvent, a bulk polymerization method that utilizes liquefied propylene or the like as a solvent, and a gas-phase polymerization method that substantially does not utilize a solvent. Among these, the bulk polymerization method and the gas-phase polymerization method are preferable.

Since the solid catalyst component according to one embodiment of the invention supports a phthalic acid diester (that achieves excellent first-step propylene polymerization activity (homo polymerization activity) and stereoregularity) and an ether-carbonate (that exhibits high adhesion to the surface of the solid catalyst component, and suppresses a reaction in the initial stage of polymerization while achieving excellent sustainability of polymerization activity) in a well-balanced manner, it is possible to solve the problem (i.e., copolymerization activity and sustainability of polymerization activity are low) that occurs when using a solid catalyst component that includes only a phthalic acid diester. Therefore, it is possible to maintain second-step copolymerization activity at a high level while maintaining first-step homo-polymerization activity and the stereoregularity of the resulting crystalline polymer (homo-polymerization part) at a high level by utilizing the solid catalyst component according to one embodiment of the invention. This makes it possible to increase the ethylene content in the resulting polymer, and the ratio (block ratio) of an ethylene-propylene copolymer rubber (EPR) (rubber part and EPR). It is considered that a polymer that exhibits relatively high rigidity can thus be obtained.

EXAMPLES

The invention is further described below by way of examples. Note that the following examples are for illustration purposes only, and the invention is not limited to the following examples.

Example 1

Production of Solid Catalyst Component (A1)

(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution. A suspension prepared using 20 g (175 mmol) of spherical diethoxymagnesium (sphericity: 1.10), 80 ml (753 mmol) of toluene, and 1.8 ml (7.8 mmol) of di-n-propyl phthalate was added to the solution. The mixture was stirred at −5° C. for 1 hour, and heated to 110° C. 3.6 ml (15.5 mmol) of di-n-propyl phthalate was added to the mixture while heating the mixture. After reacting the mixture at 110° C. for 2 hours with stirring, the resulting reaction mixture was allowed to stand, and the supernatant liquid was removed to obtain a reaction product slurry. After the addition of 187 ml of toluene (100° C.) to the reaction product slurry, the mixture was stirred and allowed to stand, and the supernatant liquid was removed. This operation was repeated four times to wash the reaction product to obtain an intermediate composition (1) in the form of a slurry.

(2) Second Step 170 ml (1600 mmol) of toluene and 30 ml (273 mmol) of titanium tetrachloride were added to the intermediate composition (1) in the form of a slurry. The mixture was heated to 110° C., and reacted for 2 hours with stirring. After completion of the reaction, the supernatant liquid (toluene) was removed. After the addition of 180 ml of toluene and 20 ml (182 mmol) of titanium tetrachloride, the mixture was heated. After the addition of 0.5 ml (2.2 mmol) of di-n-propyl phthalate at 80° C., the mixture was heated to 110° C., and reacted for 2 hours with stirring. The resulting reaction mixture was allowed to stand, and the supernatant liquid was removed to obtain a reaction product slurry. After the addition of 187 ml of toluene (100° C.) to the reaction product slurry, the mixture was stirred and allowed to stand, and the supernatant liquid was removed. This operation was repeated twice. After the addition of 150 ml of n-heptane (60° C.), the mixture was stirred and allowed to stand, and the supernatant liquid was removed. This operation was repeated five times to wash the reaction product to obtain an intermediate composition (2) in the form of a slurry.

(3) Third Step 150 ml (1024 mmol) of heptane was added to the intermediate composition (2) in the form of a slurry to adjust the concentration of titanium tetrachloride in the reaction mixture to 0.2 mass %, and the mixture was heated. After the addition of 0.2 ml (1.4 mmol) of 2-ethoxyethyl methyl carbonate at 80° C., the mixture was reacted at 80° C. for 1 hour with stirring. The resulting reaction mixture was allowed to stand, and the supernatant liquid was removed to obtain a reaction product slurry. After the addition of 150 ml of n-heptane (60° C.) to the reaction product slurry, the mixture was stirred and allowed to stand, and the supernatant liquid was removed. This operation was repeated twice to wash the reaction product to obtain about 20 g of a solid catalyst component (A1) for olefin polymerization. The solid catalyst component (A1) had a magnesium atom content of 19.8 mass %, a titanium atom content of 1.6 mass %, a halogen atom content of 62.6 mass %, a phthalic acid diester content of 11.6 mass %, and a 2-ethoxyethyl methyl carbonate content of 0.9 mass %.

Preparation of Propylene Polymerization Catalyst (B1) and Polymerization of Propylene An autoclave (internal volume: 2.0 l) equipped with a stirrer in which the internal atmosphere had been completely replaced by nitrogen gas, was charged with 1.32 mmol of triethylaluminum, 0.13 mmol of cyclohexylmethyldimethoxysilane (CMDMS), and the solid catalyst component (A1) (0.0013 mmol on a titanium atom basis) to prepare an olefin polymerization catalyst (B 1). The autoclave was charged with 9.0 l of hydrogen gas and 1.4 l of liquefied propylene. The liquefied propylene was subjected to preliminary polymerization at 20° C. for 5 minutes under a pressure of 1.1 MPa, heated, and polymerized at 70° C. for 1 hour under a pressure of 3.5 MPa to obtain a propylene polymer (polypropylene). The polymerization activity per gram of the solid catalyst component, the melt flow rate (MFR) of the polymer, the p-xylene-soluble content (XS) in the polymer, the isotactic pentad fraction (NMR-mmmm) of the polymer, and the flexural modulus (FM) of the polymer were measured as described below. The results are shown in Table 1.

Propylene Polymerization Activity

The propylene polymerization activity per gram of the solid catalyst component was calculated using the following expression.

Propylene polymerization activity (kg-pp/g-catalyst)= mass (kg) of polypropylene/mass (g) of solid catalyst component included in olefin polymerization catalyst Melt Flow Rate (MFR) of Polypropylene The melt flow rate (MFR) (melt flow index) (g/10 min) of homo-polypropylene was measured in accordance with ASTM D1238 (JIS K 7210).

Xylene-Soluble Content (XS) in Polypropylene

A flask equipped with a stirrer was charged with 4.0 g of the polymer (homo-polypropylene) and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) under the condition of boiling point. The solution was cooled to 23° C. over 1 hour, and an insoluble component and a soluble component were separated by filtration. A solution of the soluble component was collected, and p-xylene was evaporated by heating (drying) under reduced pressure. The weight of the residue was determined, and the relative ratio (mass %) with respect to the polymer (homo-polypropylene) was calculated to determine the xylene-soluble content (XS).

Isotactic Pentad Fraction (NMR-Mmmm) of Polypropylene

The term "isotactic pentad fraction (NMR-mmmm)" refers to the fraction (%) of a propylene monomer unit situated at the center of an isotactic chain (i.e., a chain in which five propylene monomer units are sequentially meso-linked) of a pentad unit in a polypropylene molecular chain that is measured by the method described in A. Zambelli et al., Macromolecules, 6, 925 (1973). The isotactic pentad fraction (NMR-mmmm) is calculated using $^{13}$C-NMR. The area fraction of the mmmm peak with respect to the total absorption peaks in the methyl-carbon region of the $^{13}$C-NMR spectrum was calculated, and taken as the isotactic pentad fraction. The isotactic pentad fraction (NMR-mmmm) of polypropylene was determined by performing $^{13}$C-NMR measurement using an NMR device ("JNM-ECA400" manufactured by JEOL Ltd.) under the following conditions.

$^{13}$C-NMR measurement conditions
Measurement mode: proton decoupling method
Pulse width: 7.25 μsec
Pulse repetition time: 7.4 sec
Integration count: 10,000
Solvent: tetrachloroethane-d2
Sample concentration: 200 mg/3.0 ml Flexural Modulus (FM) of Polymer The polymer was injection-molded to prepare a property measurement specimen. The specimen was conditioned in a temperature-controlled room maintained at 23° C. for 144 hours or more, and the flexural modulus (FM) (MPa) was measured in accordance with JIS K 7171, using the specimen provided that a liquid/powder exudate was not observed on the surface thereof.

The sphericity of the dialkoxymagnesium particles, and the content of magnesium atoms, titanium atoms, halogen atoms, and the internal electron donor compound in the solid catalyst component were measured as described below.

Sphericity of Dialkoxymagnesium Particles

The sphericity of the dialkoxymagnesium particles was determined by photographing the dialkoxymagnesium particles using a scanning electron microscope ("JSM-7500F" manufactured by JEOL Ltd.) at a magnification at which 500 to 1000 dialkoxymagnesium particles were displayed on a screen, randomly sampling 500 or more dialkoxymagnesium particles from the photographed dialkoxymagnesium particles, determining the area S and the circumferential length L of each dialkoxymagnesium particle using image analysis software ("MacView Ver. 4.0" manufactured by MOUN-TECH Co., Ltd.), calculating the sphericity of each dialkoxymagnesium particle using the following expression, and calculating the arithmetic mean value thereof.

Sphericity of each dialkoxymagnesium particle=$L^2 \div (4\pi \times S)$

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (oxidation-reduction titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Internal Electron Donor Compound in Solid Catalyst Component

The content of the internal electron donor compound in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration.
Measurement conditions
Column: packed column (2.6 (diameter)×2.1 m, Silicone SE-30 10%, Chromosorb
WAW DMCS 80/100, manufactured by GL Sciences Ltd.)
Detector: flame ionization detector (FID)
Carrier gas: helium, flow rate: 40 ml/min
Measurement temperature: vaporization chamber: 280° C., column: 225° C., detector:
280° C., or vaporization chamber: 265° C., column: 180° C., detector: 265° C.

Example 2A

Production of Solid Catalyst Component (A2)

(1) First Step
An intermediate composition (1) in the form of a slurry was obtained in the same manner as in the first step for producing the solid catalyst component (A1).
(2) Second Step
170 ml (1600 mmol) of toluene and 30 ml (273 mmol) of titanium tetrachloride were added to the intermediate composition (1) in the form of a slurry. The mixture was heated to 110° C., and reacted for 2 hours with stirring. After completion of the reaction, the supernatant liquid (toluene) was removed. After the addition of 180 ml of toluene and 20 ml (182 mmol) of titanium tetrachloride, the mixture was heated. After the addition of 0.4 ml (1.7 mmol) of di-n-propyl phthalate at 80° C., the mixture was heated to 110° C., and reacted for 2 hours with stirring. The resulting reaction mixture was allowed to stand, and the supernatant liquid was removed to obtain a reaction product slurry. After the addition of 187 ml of toluene (100° C.) to the reaction product slurry, the mixture was stirred and allowed to stand, and the supernatant liquid was removed. This operation was repeated twice to wash the reaction product to obtain an intermediate composition (2) in the form of a slurry.
(3) Third Step
187 ml (1760 mmol) of toluene was added to the intermediate composition (2) in the form of a slurry to adjust the concentration of titanium tetrachloride in the reaction mixture to 1.3 mass %, and the mixture was heated. After the addition of 0.4 ml (2.8 mmol) of 2-ethoxyethyl methyl carbonate at 80° C., the mixture was heated to 100° C., and reacted at 100° C. for 1 hour with stirring. The resulting reaction mixture was allowed to stand, and the supernatant liquid was removed to obtain a reaction product slurry. After the addition of 150 ml of n-heptane (60° C.) to the reaction product slurry, the mixture was stirred and allowed to stand, and the supernatant liquid was removed. This operation was repeated seven times to wash the reaction product to obtain about 20 g of a solid catalyst component (A2) for olefin polymerization.

The solid catalyst component (A2) had a magnesium atom content of 20.1 mass %, a titanium atom content of 1.5 mass %, a halogen atom content of 62.3 mass %, phthalic acid diester content of 12.1 mass %, and a 2-ethoxyethyl methyl carbonate content of 1.5 mass %.
Preparation of Polymerization Catalyst (B2-1) and Polymerization of Propylene
A propylene polymerization catalyst (B2-1) was prepared, and polypropylene was produced in the same manner as in Example 1, except that the solid catalyst component (A2) was used instead of the solid catalyst component (A1), and the propylene polymerization activity and the resulting polymer were evaluated in the same manner as described above. The results are shown in Table 1.

Example 2B

Preparation of Copolymerization Catalyst (B2-2) and Ethylene-Propylene Block Copolymerization A copolymerization catalyst was prepared as described below using the solid catalyst component (A2), and a copolymer was produced by multistep polymerization as described below. The ethylene-propylene block copolymerization activity (ICP (impact copolymer) activity) during copolymerization was measured to evaluate the sustainability of polymerization activity, and the block ratio, the flexural modulus (FM), and the Izod impact strength of the resulting ethylene-propylene block copolymer were measured.

An autoclave (internal volume: 2.0 l) equipped with a stirrer in which the internal atmosphere had been completely replaced by nitrogen gas, was charged with 2.4 mmol of triethylaluminum, 0.24 mmol of cyclohexylmethyldimethoxysilane, and the solid catalyst component (A2) (0.003 mmol on a titanium atom basis) to prepare an ethylene-propylene copolymerization catalyst (B2-2).

An autoclave equipped with a stirrer was charged with 10.2 mg of the ethylene-propylene copolymerization catalyst (B2-2), and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 75 minutes. The pressure inside the autoclave was then returned to normal pressure.

After feeding ethylene, propylene, and hydrogen to the autoclave in a molar ratio of 1.0/1.0/0.043, the mixture was heated to 70° C., and reacted at 70° C. for 1 hour under a pressure of 1.2 MPa while feeding ethylene, propylene, and hydrogen in a ratio of 2/2/0.086 (1/min) to obtain an ethylene-propylene copolymer. The copolymerization activity (ICP activity) (kg-ICP/(g-cat·hr)), and the block ratio (mass %) and the Izod impact strength of the ethylene-propylene copolymer, were measured as described below. The flexural modulus (FM) of the ethylene-propylene copolymer was measured in the same manner as in Example 1. The results are shown in Table 2.
Ethylene-propylene block copolymerization activity (ICP activity) (kg-ICP/(g-cat·hr))
The ethylene-propylene block copolymerization activity (ICP activity) when producing the ethylene-propylene block copolymer, and the block ratio of the resulting copolymer were calculated using the following expressions.

Ethylene-propylene block copolymerization activity
(ICP activity)(kg-ICP/(g-cat·hr))=((I(kg)−G(kg))/
mass(g) of solid catalyst component included in
olefin polymerization catalyst)/1.0(hr)

Note that I is the mass (kg) of the autoclave after completion of copolymerization, and G is the mass (kg) of the autoclave after unreacted monomers had been removed after completion of homo-PP polymerization.

Block ratio (mass %)

Block ratio(mass %)={(I(g)−G(g))/(I(g)−F(g))}×100

Note that I is the mass (g) of the autoclave after completion of copolymerization, G is the mass (g) of the autoclave after unreacted monomers had been removed after completion of homo-PP polymerization, and F is the mass (g) of the autoclave.

Izod Impact Strength 0.10 wt % of IRGANOX 1010 (manufactured by BASF), 0.10 wt % of IRGAFOS 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare a property measurement specimen. The specimen was conditioned in a temperature-controlled room maintained at 23° C. for 144 hours or more, and the Izod impact strength of the specimen was measured in accordance with JIS K 7110 ("Method of Izod impact test for rigid plastics") using an Izod tester ("Model A-121804405" manufactured by Toyo Seiki Seisaku-Sho, Ltd.).

Shape of specimen: ISO 180/4A, thickness: 3.2 mm, width: 12.7 mm, length: 63.5 mm
Shape of notch: type-A notch (radius: 0.25 mm) formed using a die provided with a notch
Temperature: 23° C. and −30° C.
Impact speed: 3.5 m/s
Nominal pendulum energy: 5.5 J (23° C.) and 2.75 J (−30° C.)

Example 3A

Preparation of Polymerization Catalyst (B3-1) and Polymerization

A propylene polymerization catalyst (B3-1) was prepared in the same manner as in Example 2A, except that 0.13 mmol of dicyclopentyldimethoxysilane (DCPDMS) was used instead of 0.13 mmol of cyclohexylmethyldimethoxysilane (CMDMS), and polypropylene was produced in the same manner as in Example 2A. The propylene polymerization activity and the resulting polymer were evaluated in the same manner as described above. The results are shown in Table 1.

Example 3B

Preparation of Copolymerization Catalyst (B3-2) and Ethylene-Propylene Block Copolymerization An ethylene-propylene copolymerization catalyst was prepared in the same manner as in Example 2B, except that 0.24 mmol of dicyclopentyldimethoxysilane (DCPDMS) was used instead of 0.24 mmol of cyclohexylmethyldimethoxysilane (CMDMS), and an ethylene-propylene block copolymer was produced in the same manner as in Example 2B. The ethylene-propylene block copolymerization activity (ICP activity) and the resulting polymer were evaluated in the same manner as described above. The results are shown in Table 2.

Example 4A

Preparation of Polymerization Catalyst (B4-1) and Polymerization

A propylene polymerization catalyst (B4-1) was prepared in the same manner as in Example 2A, except that 0.13 mmol of diisopropyldimethoxysilane (DIPDMS) was used instead of 0.13 mmol of cyclohexylmethyldimethoxysilane (CMDMS), and polypropylene was produced in the same manner as in Example 2A. The propylene polymerization activity and the resulting polymer were evaluated in the same manner as described above. The results are shown in Table 1.

Example 4B

Preparation of Copolymerization Catalyst (B4-2) and Ethylene-Propylene Block Copolymerization An ethylene-propylene copolymerization catalyst (B4-2) was prepared in the same manner as in Example 2B, except that 0.24 mmol of diisopropyldimethoxysilane (DIPDMS) was used instead of 0.24 mmol of cyclohexylmethyldimethoxysilane (CMDMS), and an ethylene-propylene block copolymer was produced in the same manner as in Example 2B. The ethylene-propylene block copolymerization activity (ICP activity) and the resulting polymer were evaluated in the same manner as described above. The results are shown in Table 2.

Example 5A

Preparation of Polymerization Catalyst (B5-1) and Polymerization

A propylene polymerization catalyst (B5-1) was prepared in the same manner as in Example 2A, except that 0.13 mmol of dicyclopentylbis(ethylamino)silane (DCPEAS) was used instead of 0.13 mmol of cyclohexylmethyldimethoxysilane (CMDMS), and the amount of hydrogen gas was changed from 9.0 l to 6.0 l, and polypropylene was produced in the same manner as in Example 2A. The propylene polymerization activity and the resulting polymer were evaluated in the same manner as described above. The results are shown in Table 1.

Example 5B

Preparation of Copolymerization Catalyst (B5-2) and Ethylene-Propylene Block Copolymerization An ethylene-propylene copolymerization catalyst (B5-2) was prepared in the same manner as in Example 2B, except that 0.24 mmol of dicyclopentylbis(ethylamino)silane (DCPEAS) was used instead of 0.24 mmol of cyclohexylmethyldimethoxysilane (CMDMS), and an ethylene-propylene block copolymer was produced in the same manner as in Example 2B. The ethylene-propylene block copolymerization activity (ICP activity) and the resulting polymer were evaluated in the same manner as described above. The results are shown in Table 2.

Example 6A

Preparation of Polymerization Catalyst (B6-1) and Polymerization

A propylene polymerization catalyst was prepared in the same manner as in Example 2A, except that 0.13 mmol of diethylaminotriethoxysilane (DEATES) was used instead of 0.13 mmol of cyclohexylmethyldimethoxysilane (CMDMS), and the amount of hydrogen gas was changed from 9.0 l to 6.0 l, and polypropylene was produced in the same manner as in Example 2A. The homopropylene polymerization activity and the resulting polymer were evaluated in the same manner as described above. The results are shown in Table 1.

Example 6B

Preparation of Copolymerization Catalyst (B6-2) and Ethylene-Propylene Block Copolymerization An ethylene-propylene copolymerization catalyst (B6-2) was prepared in the same manner as in Example 2B, except that 0.24 mmol of diethylaminotriethoxysilane (DEATES) was used instead of 0.24 mmol of cyclohexylmethyldimethoxysilane (CMDMS), and an ethylene-propylene block copolymer was produced in the same manner as in Example 2B. The ethylene-propylene block copolymerization activity (ICP activity) and the resulting polymer were evaluated in the same manner as described above. The results are shown in Table 2.

Example 7A

Preparation of Polymerization Catalyst (B7-1) and Polymerization

Preparation of Polymerization Catalyst and Polymerization

A propylene polymerization catalyst was prepared in the same manner as in Example 2A, except that 0.13 mmol of a mixture prepared by mixing dicyclopentyldimethoxysilane and n-propyltriethoxysilane in a molar ratio (dicyclopentyldimethoxysilane:n-propyltriethoxysilane) of 5:95 was used instead of 0.13 mmol of cyclohexylmethyldimethoxysilane (CMDMS), and polypropylene was produced in the same manner as in Example 2A. The propylene polymerization activity and the resulting polymer were evaluated in the same manner as described above. The results are shown in Table 1.

Example 7B

Preparation of Copolymerization Catalyst (B7-2) and Ethylene-Propylene Block Copolymerization An ethylene-propylene copolymerization catalyst was prepared in the same manner as in Example 2B, except that 0.24 mmol of a mixture prepared by mixing dicyclopentyldimethoxysilane and n-propyltriethoxysilane in a molar ratio (dicyclopentyldimethoxysilane:n-propyltriethoxysilane) of 5:95 was used instead of 0.24 mmol of cyclohexylmethyldimethoxysilane (CMDMS), and an ethylene-propylene block copolymer was produced in the same manner as in Example 2B. The ethylene-propylene block copolymerization activity (ICP activity) and the resulting polymer were evaluated in the same manner as described above. The results are shown in Table 2.

Example 8

Production of Solid Catalyst Component (A3)

A solid catalyst component (A3) was produced in the same manner as in Example 2, except that 0.2 ml (1.4 mmol) of 2-ethoxyethyl methyl carbonate was used in the second step instead of 0.4 ml (1.7 mmol) of di-n-propyl phthalate. The solid catalyst component (A3) had a magnesium atom content of 20.6 mass %, a titanium atom content of 1.1 mass %, a halogen atom content of 63.0 mass %, a phthalic acid diester content of 12.7 mass %, and a 2-ethoxyethyl methyl carbonate content of 2.3 mass %.

Preparation of Polymerization Catalyst and Polymerization of Propylene

A catalyst (B8) was prepared, and polypropylene was produced in the same manner as in Example 1, except that the solid catalyst component (A3) was used instead of the solid catalyst component (A1), and the propylene polymerization activity and the resulting polymer were evaluated in the same manner as described above. The results are shown in Table 1.

Example 9

Production of Solid Catalyst Component (A4)

A solid catalyst component (A4) was produced in the same manner as in Example 2, except that 0.4 ml (2.5 mmol) of 2-ethoxyethyl ethyl carbonate was used in the third step instead of 0.4 ml (2.8 mmol) of 2-ethoxyethyl methyl carbonate. The solid catalyst component (A4) had a magnesium atom content of 19.5 mass %, a titanium atom content of 1.4 mass %, a halogen atom content of 61.3 mass %, a total phthalic acid diester content of 15.5 mass %, and an ether-carbonate content of 1.6 mass %.

Preparation of Polymerization Catalyst and Polymerization

A catalyst (B9) was prepared, and polypropylene was produced in the same manner as in Example 1, except that the solid catalyst component (A4) was used instead of the solid catalyst component (A1), and the propylene polymerization activity and the resulting polymer were evaluated in the same manner as described above. The results are shown in Table 1.

Example 10

Production of Solid Catalyst Component (A5)

A solid catalyst component (A5) was produced in the same manner as in Example 2, except that 0.4 ml (2.1 mmol) of 2-ethoxyethyl phenyl carbonate was used in the third step instead of 0.4 ml (2.8 mmol) of 2-ethoxyethyl methyl carbonate. The solid catalyst component (A5) had a magnesium atom content of 20.1 mass %, a titanium atom content of 1.4 mass %, a halogen atom content of 61.8 mass %, a total phthalic acid diester content of 13.0 mass %, and a 2-ethoxyethyl phenyl carbonate content of 1.1 mass %.

Preparation of Polymerization Catalyst and Polymerization

A catalyst (B10) was prepared, and polypropylene was produced in the same manner as in Example 1, except that the solid catalyst component (A5) was used instead of the solid catalyst component (A1), and the propylene polymerization activity and the resulting polymer were evaluated in the same manner as described above. The results are shown in Table 1.

Example 11A

Production of Solid Catalyst Component (A6)

(1) First Step

A 500 ml round-bottom flask equipped with a stirrer in which the internal atmosphere had been sufficiently replaced by nitrogen gas, was charged with 120 ml (819 mmol) of n-heptane. After the addition of 15 g (158 mmol) of anhydrous magnesium chloride and 106 ml (274 mmol) of tetrabutoxytitanium, the mixture was reacted at 90° C. for 1.5 hours to obtain a homogenous solution. After cooling the solution to 40° C., 24 ml (88 mmol) of methyl hydrogen polysiloxane (20 cSt) was added to the solution, and a precipitation reaction was effected for 5 hours. The resulting reaction mixture was allowed to stand, and the supernatant liquid was removed to obtain a reaction product slurry. The reaction product was sufficiently washed with n-heptane. A 500 ml round-bottom flask equipped with a stirrer in which the internal atmosphere had been sufficiently replaced by nitrogen gas, was charged with 40 g of the reaction product, and n-heptane was added to the flask so that the concentration of the reaction product was 200 mg/ml. After the addition of 12 ml (105 mmol) of $SiCl_4$, the mixture was reacted at 90° C. for 3 hours. The resulting reaction mixture was allowed to stand, and the supernatant liquid was removed to obtain a reaction product slurry. The reaction product was sufficiently washed with n-heptane. After the addition of n-heptane so that the concentration of the reaction product was 100 mg/ml, 20 ml (182 mmol) of $TiCl_4$ was added to the mixture. After the addition of 7.2 ml (27.1 mmol) of dibutyl phthalate, the mixture was reacted at 95° C. for 3 hours. The resulting reaction mixture was allowed to stand, and the supernatant liquid was removed to obtain a reaction product slurry. After the addition of 120 ml of n-heptane to the reaction product slurry, the mixture was stirred and allowed to stand, and the supernatant liquid was removed. This operation was repeated seven times to wash the reaction product to obtain an intermediate composition (1) in the form of a slurry.

(2) Second Step 100 ml (683 mmol) of n-heptane and 20 ml (182 mmol) of titanium tetrachloride were added to the intermediate composition (1) in the form of a slurry. The mixture was heated to 100° C., and reacted for 2 hours with stirring. After completion of the reaction, the supernatant liquid (toluene) was removed, followed by the addition of 100 ml of n-heptane. After the addition of 20 ml of titanium tetrachloride, 0.8 ml (3.4 mmol) of di-n-propyl phthalate was added to the mixture, and the mixture was reacted at 95° C. for 3 hours. The resulting reaction mixture was allowed to stand, and the supernatant liquid was removed to obtain a reaction product slurry.

After treating the reaction product slurry with 100 ml of heptane under reflux, the mixture was allowed to stand, and the supernatant liquid was removed. This operation was repeated twice to wash the reaction product to obtain an intermediate composition (2) in the form of a slurry.

(3) Third Step 187 ml (1760 mmol) of toluene was added to the intermediate composition (2) in the form of a slurry to adjust the concentration of titanium tetrachloride in the reaction mixture to 2.5 mass %, and the mixture was heated. After the addition of 0.8 ml (5.6 mmol) of 2-ethoxyethyl methyl carbonate at 80° C., the mixture was reacted for 1 hour with stirring under reflux. The resulting reaction mixture was allowed to stand, and the supernatant liquid was removed to obtain a reaction product slurry. After the addition of 150 ml of n-heptane (60° C.) to the reaction product slurry, the mixture was stirred and allowed to stand, and the supernatant liquid was removed. This operation was repeated seven times to wash the reaction product, followed by drying under reduced pressure to obtain a powdery solid catalyst component (A6) for olefin polymerization. The solid catalyst component (A6) had a magnesium atom content of 19.6 mass %, a titanium atom content of 1.8 mass %, a halogen atom content of 62.6 mass %, a total content of a phthalic acid diester and an ether compound of 13.1 mass %, and a 2-ethoxyethyl methyl carbonate content of 1.1 mass %.

Preparation of Polymerization Catalyst (B11-1) and Polymerization

A propylene polymerization catalyst (B 11-1) was prepared, and polypropylene was produced in the same manner as in Example 2A, except that the solid catalyst component (A6) was used instead of the solid catalyst component (A2), and the propylene polymerization activity and the resulting polymer were evaluated in the same manner as described above. The results are shown in Table 1.

Preparation of Copolymerization Catalyst (B 11-2) and Ethylene-Propylene Block Copolymerization An ethylene-propylene copolymerization catalyst (B11-2) was prepared, and polypropylene and an ethylene-propylene block copolymer were produced in the same manner as in Example 2B, except that the solid catalyst component (A6) was used instead of the solid catalyst component (A2), and the ethylene-propylene block copolymerization activity (ICP activity) and the resulting polymer were evaluated. The results are shown in Table 2.

Comparative Example 1

Production of Solid Catalyst Component (a1)

(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution. A suspension prepared using 20 g (175 mmol) of spherical diethoxymagnesium (sphericity: 1.10), 80 ml (753 mmol) of toluene, and 1.2 ml (7.5 mmol) of 2-ethoxyethyl ethyl carbonate was added to the solution. The mixture was stirred at −5° C. for 1 hour, and heated to 110° C. 2.5 ml (15.6 mmol) of 2-ethoxyethyl ethyl carbonate was added stepwise to the mixture while heating the mixture. After reacting the mixture at 110° C. for 2 hours with stirring, the resulting reaction mixture was allowed to stand, and the supernatant liquid was removed to obtain a reaction product slurry. After the addition of 187 ml of toluene (100° C.) to the reaction product slurry, the mixture was stirred and allowed to stand, and the supernatant liquid was removed. This operation was repeated four times to wash the reaction product to obtain a reaction product slurry (1) including a solid component.

(2) Second Step 170 ml (1600 mmol) of toluene and 30 ml (273 mmol) of titanium tetrachloride were added to the reaction product slurry (1). The mixture was heated to 110° C., and reacted for 2 hours with stirring. After completion of the reaction, the supernatant liquid (toluene) was removed. After the addition of 180 ml of toluene and 20 ml (182 mmol) of titanium tetrachloride, the mixture was heated to 110° C., and reacted for 2 hours with stirring. The resulting reaction mixture was allowed to stand, and the supernatant liquid was removed to obtain a reaction product slurry (2). After the addition of 150 ml of n-heptane (60° C.) to the reaction product slurry (2), the mixture was stirred and allowed to stand, and the supernatant liquid was removed. This operation was repeated twice to wash the reaction product to obtain about 20 g of a solid catalyst component (a1) for olefin polymerization. The solid catalyst component (a1) had a magnesium atom content of 21.7 mass %, a titanium atom content of 2.2 mass %, a halogen atom content of 64.6 mass %, and a total 2-ethoxyethyl ethyl carbonate content of 5.5 mass %.

Preparation of Polymerization Catalyst (b1-1) and Polymerization

A propylene polymerization catalyst (b1-1) was prepared, and polypropylene was produced in the same manner as in Example 1, except that the solid catalyst component (a1) was used instead of the solid catalyst component (A1), and the propylene polymerization activity and the resulting polymer were evaluated in the same manner as described above. The results are shown in Table 1.

Preparation of Copolymerization Catalyst (b1-2) and Ethylene-Propylene Block Copolymerization An ethylene-propylene copolymerization catalyst (b1-2) was prepared, and an ethylene-propylene block copolymer was produced in the same manner as in Example 6B, except that the solid catalyst component (a1) was used instead of the solid catalyst component (A6), and the ethylene-propylene block copolymerization activity (ICP activity) and the resulting polymer were evaluated. The results are shown in Table 2.

Comparative Example 2

Production of Solid Catalyst Component (a2)

A solid catalyst component (a2) was produced in the same manner as in Comparative Example 1, except that di-n-propyl phthalate (equimolar amount) was used in the first step instead of 2-ethoxyethyl ethyl carbonate. The solid catalyst component (a2) had a magnesium atom content of 19.2 mass %, a titanium atom content of 2.8 mass %, a halogen atom content of 61.3 mass %, and a total phthalic acid diester content of 16.2 mass %.

Preparation of Polymerization Catalyst (b2-1) and Polymerization

A propylene polymerization catalyst (b2-1) was prepared, and polypropylene was produced in the same manner as in Comparative Example 1, except that the solid catalyst component (a2) was used instead of the solid catalyst component (a1), and the propylene polymerization activity and the resulting polymer were evaluated in the same manner as described above. The results are shown in Table 1.

Preparation of Copolymerization Catalyst (b2-2) and Ethylene-Propylene Block Copolymerization An ethylene-propylene copolymerization catalyst (b2-2) was prepared, and an ethylene-propylene block copolymer was produced in the same manner as in Comparative Example 1, except that the solid catalyst component (a2) was used instead of the solid catalyst component (a1), and the ethylene-propylene block copolymerization activity (ICP activity) and the resulting polymer were evaluated. The results are shown in Table 2.

TABLE 1

| | Polymerization activity (kg-pp/g-cat) | MFR (g/10 min) | XS (mass %) | NMR-mmmm (%) | FM (MPa) |
|---|---|---|---|---|---|
| Example 1 | 64.3 | 22 | 0.6 | 98.5 | 1770 |
| Example 2A | 61.5 | 20 | 0.4 | 99.1 | 1810 |
| Example 3A | 58.2 | 58 | 0.8 | 98.2 | 1750 |
| Example 4A | 60.1 | 110 | 0.5 | 98.8 | 1880 |
| Example 5A | 55.4 | 200 | 0.7 | 98.7 | 1870 |
| Example 6A | 56.1 | 220 | 0.7 | 98.8 | 1870 |
| Example 7A | 58.6 | 140 | 0.8 | 98.5 | 1850 |
| Example 8 | 49.0 | 19 | 0.7 | 98.8 | 1880 |
| Example 9 | 56.5 | 18 | 0.7 | 98.6 | No data available |
| Example 10 | 49.5 | 17 | 0.8 | 98.5 | No data available |
| Example 11A | 48.7 | 21 | 0.9 | 98.3 | 1800 |
| Comparative Example 1A | 49.5 | 200 | 1.7 | 96.7 | 1700 |
| Comparative Example 2A | 65.3 | 240 | 1.8 | 96.5 | 1640 |

TABLE 2

| | ICP polymerization activity (kg-ICP/g-cat·hr) | Block ratio (mass %) | FM (MPa) | Izod impact strength (23° C.) (J/m) | Izod impact strength (−30° C.) (J/m) |
|---|---|---|---|---|---|
| Example 2B | 17.3 | 27 | 1150 | Did not break | 7.6 |
| Example 3B | 15.6 | 25 | 1210 | Did not break | 7.0 |
| Example 4B | 16.2 | 23 | 1250 | 16.3 | 6.5 |
| Example 5B | 17.5 | 32 | 1030 | Did not break | 9.2 |
| Example 6B | 14.5 | 21 | 1400 | 10.0 | 4.5 |
| Example 7B | 15.0 | 23 | 1300 | 12.5 | 6.0 |
| Example 11B | 14.9 | 25 | 1210 | Did not break | 7.1 |
| Comparative Example 1B | 13.8 | 21 | 1100 | 9.5 | 4.8 |
| Comparative Example 2B | 12.6 | 14 | 1240 | 7.5 | 3.1 |

As is clear from the results shown in Tables 1 and 2, the olefin polymerization catalysts respectively prepared using the solid catalyst components obtained in Examples 1 to 11 achieved high olefin polymerization activity and high ICP activity (i.e., high sustainability of olefin polymerization during copolymerization). The resulting homopolymers had a satisfactory melt flow rate (MFR) (i.e., exhibited excellent moldability), and had a satisfactory xylene-soluble content (XS) and isotactic pentad fraction (NMR-mmmm) (i.e., exhibited excellent stereoregularity). The resulting copolymers had a satisfactory block ratio (i.e., excellent impact copolymer (ICP) copolymerization performance was achieved). On the other hand, when using the solid catalyst component that did not include the component (A) and the component (B) as the internal electron donor compound, the ICP activity was low (i.e., the sustainability of olefin polymerization was low). The resulting homopolymer had a low xylene-soluble content (XS) and isotactic pentad fraction (NMR-mmmm) (i.e., exhibited inferior stereoregularity).

INDUSTRIAL APPLICABILITY

The embodiments of the invention thus provide a novel solid catalyst component for olefin polymerization that achieves excellent olefin polymerization activity and activity with respect to hydrogen during polymerization, and can produce an olefin polymer that exhibits a high MFR, high stereoregularity, and excellent rigidity, and also provide an olefin polymerization catalyst, and a method for producing an olefin polymer.

The invention claimed is:

1. A solid catalyst component, comprising:
magnesium,
titanium,
a halogen,
a compound represented by formula (1):

$$(R^1)_k C_6 H_{4-k}(COOR^2)(COOR^3) \qquad (1),\text{ and}$$

a compound represented by formula (2):

$$R^4 O-C(=O)-O-Z-OR^5 \qquad (2),$$

wherein $R^1$ is an alkyl group having 1 to 8 carbon atoms or a halogen atom, $R^2$ and $R^3$ are an alkyl group having 1 to 12 carbon atoms, wherein $R^2$ and $R^3$ are either identical or different, and k, which is the number of substituents $R^1$, is 0, 1, or 2, wherein each $R^1$ is either identical or different when k is 2, and wherein $R^4$ and $R^5$ are a linear alkyl group having 1 to 20 carbon atoms, a branched alkyl group having 3 to 20 carbon atoms, a vinyl group, a linear or branched alkenyl group having 3 to 20 carbon atoms, a linear halogen-substituted alkyl group having 1 to 20 carbon atoms, a branched halogen-substituted alkyl group having 3 to 20 carbon atoms, a linear halogen-substituted alkenyl group having 2 to 20 carbon atoms, a branched halogen-substituted alkenyl group having 3 to 20 carbon atoms, a cycloalkyl group having 3 to 20 carbon atoms, a cycloalkenyl group having 3 to 20 carbon atoms, a halogen-substituted cycloalkyl group having 3 to 20 carbon atoms, a halogen-substituted cycloalkenyl group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 2 to 24 carbon atoms that is terminated by a carbon atom, an oxygen atom-containing hydrocarbon group having 2 to 24 carbon atoms that is terminated by a carbon atom, or a phosphorus-containing hydrocarbon group having 2 to 24 carbon atoms that is terminated by a carbon atom, provided that $R^4$ and $R^5$ are either identical or different, the nitrogen atom-containing hydrocarbon group having 2 to 24 carbon atoms excludes a group that is terminated by a C=N group, the oxygen atom-containing hydrocarbon group having 2 to 24 carbon atoms excludes a group that is terminated by a carbonyl group, and the phosphorus-containing hydrocarbon group having 2 to 24 carbon atoms excludes a group that is terminated by a C=P group, and Z is a linking group that includes a carbon atom or a carbon chain.

2. An olefin polymerization catalyst comprising:
the solid catalyst component of claim 1, and
an organoaluminum compound represented by formula (3), $$R^6_p AlQ_{3-p} \qquad (3)$$

wherein $R^6$ is an alkyl group having 1 to 6 carbon atoms, Q is a hydrogen atom, or a halogen atom, and p is a real number that satisfies $0 < p \leq 3$.

3. The olefin polymerization catalyst of claim 2, further comprising:
an external electron donor compound (III).

4. The olefin polymerization catalyst of claim 3,
wherein the external electron donor compound (III) is at least one compound selected from the group consisting of an organosilicon compound represented by formula (4):

$$R^7_q Si(OR^8)_{4-q} \qquad (4),\text{ and}$$

an aminosilane compound represented by formula (5):

$$(R^9 R^{10} N)_s SiR^{11}_{4-s} \qquad (5),$$

wherein $R^7$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, wherein each $R^7$ is either identical or different when a plurality of $R^7$ are present, $R^8$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, wherein each $R^8$ is either identical or different when a plurality of $R^8$ are present, and q is an integer from 0 to 3, and wherein $R^9$ and $R^{10}$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, wherein $R^9$ and $R^{10}$ are either identical or different, and optionally bond to each other to form a ring, $R^{11}$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, wherein each $R^{11}$ is are either identical or different when a plurality of $R^{11}$ are present, and s is an integer from 1 to 3.

5. The olefin polymerization catalyst of claim 3,
wherein the external electron donor compound (III) is phenyltrimethoxysilane, n-butyltrimethoxysilane, cyclopentyltrimethoxysilane, cyclohexyltrimethoxysilane, phenyltriethoxysilane, n-butyltriethoxysilane, cyclopentyltriethoxysilane, cyclohexyltriethoxysilane, t-butylmethyldimethoxysilane, t-butylethyldimethoxysilane, diisopropyldimethoxysilane, diisobutyldimethoxysilane, diisopentyldimethoxysilane, diphenyldimethoxysilane, dicyclopentyldimethoxysilane, cyclohexylmethyldimethoxysilane, cyclohexylcyclopentyldimethoxysilane, tetramethoxysilane, tetraethoxysilane, t-butylmethylbis(ethylamino)silane, dicyclohexylbis(ethylamino)silane, dicyclopentylbis(ethylamino)silane, bis(perhydroisoquinolino)dimethoxysilane, diethylaminotrimethoxysilane, or diethylaminotriethoxysilane.

6. The olefin polymerization catalyst of claim 3,
wherein the external electron donor compound (III) is a 1,3-diether compound represented by formula (6):

$$R^{12}OCH_2 CR^{13}R^{13}R^{14}CH_2 OR^{15} \qquad (6)$$

wherein $R^{13}$ and $R^{14}$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, wherein $R^{13}$ and $R^{14}$ are either identical or different, and optionally bond to each other to form a ring, and $R^{12}$ and $R^{15}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, wherein $R^{12}$ and $R^{15}$ are either identical or different.

7. The olefin polymerization catalyst of claim 6, wherein the 1,3-diether compound is 2-isopropyl-2-isobutyl-1,3-dimethoxypropane, 2-isopropyl-2-isopentyl-1,3-dimethoxypropane, or 9,9-bis(methoxymethyl)fluorene.

8. A method for producing an olefin polymer comprising: polymerizing an olefin in the presence of the olefin polymerization catalyst of claim 2.

* * * * *